US012619043B2

(12) United States Patent
Priest

(10) Patent No.: US 12,619,043 B2
(45) Date of Patent: May 5, 2026

(54) SYSTEMS AND METHODS FOR UTILIZING REMOTE VISUALIZATION FOR INSTALLING FIBER NETWORKS

(71) Applicant: ETAK Systems, LLC, Huntersville, NC (US)

(72) Inventor: Lee Priest, Charlotte, NC (US)

(73) Assignee: ETAK Systems, LLC, Huntersville, NC (US)

( * ) Notice: Subject to any disclaimer, the term of this patent is extended or adjusted under 35 U.S.C. 154(b) by 295 days.

(21) Appl. No.: 18/310,819

(22) Filed: May 2, 2023

(65) Prior Publication Data

US 2024/0369796 A1     Nov. 7, 2024

(51) Int. Cl.
| | |
|---|---|
| G02B 6/50 | (2006.01) |
| B64U 20/87 | (2023.01) |
| G02B 6/46 | (2006.01) |
| G02B 6/48 | (2006.01) |
| G06T 17/05 | (2011.01) |
| B64U 101/30 | (2023.01) |

(52) U.S. Cl.
CPC ............... G02B 6/50 (2013.01); B64U 20/87 (2023.01); G02B 6/47 (2023.05); G02B 6/48 (2013.01); G06T 17/05 (2013.01); *B64U 2101/30* (2023.01)

(58) Field of Classification Search
CPC ... G02B 6/50; G02B 6/47; G02B 6/48; B64U 20/87; B64U 2101/30; G06T 17/05

USPC .......................................................... 385/100
See application file for complete search history.

(56) References Cited

U.S. PATENT DOCUMENTS

| | | | | |
|---|---|---|---|---|
| 9,588,315 | B1 * | 3/2017 | Turner | G02B 6/4457 |
| 2004/0018042 | A1 * | 1/2004 | Smith | H02G 7/04 |
| | | | | 403/78 |
| 2020/0413011 | A1 * | 12/2020 | Zass | G06Q 30/0185 |
| 2022/0356674 | A1 * | 11/2022 | Norfleet | G05D 1/0238 |
| 2024/0370599 | A1 * | 11/2024 | Priest | G06T 17/05 |
| 2024/0370600 | A1 * | 11/2024 | Priest | B64U 10/00 |
| 2024/0370986 | A1 * | 11/2024 | Priest | H04L 45/126 |
| 2024/0372341 | A1 * | 11/2024 | Priest | H04N 23/90 |

OTHER PUBLICATIONS

Jonathan Kim, Dgtl Infra LLC, "Fiber Optic Network Construction: Process and Build Costs," Jul. 28, 2022, https://dgtlinfra.com/fiber-optic-network-construction-process-costs/.

* cited by examiner

*Primary Examiner* — Jerry M Blevins
(74) *Attorney, Agent, or Firm* — Baratta Law PLLC; Lawrence A. Baratta, Jr.; Ryan Odessa

(57) ABSTRACT

Systems and method for installing a fiber network include causing one or more cameras to capture a plurality of photographs of an installation area; obtaining the plurality of photographs and causing processing of the plurality of photographs to provide one or more remote visualizations of the installation area; utilizing the one or more remote visualizations to determine an optimal route for trenching fiber cables; and installing the fiber network based on the determined optimal route.

12 Claims, 20 Drawing Sheets

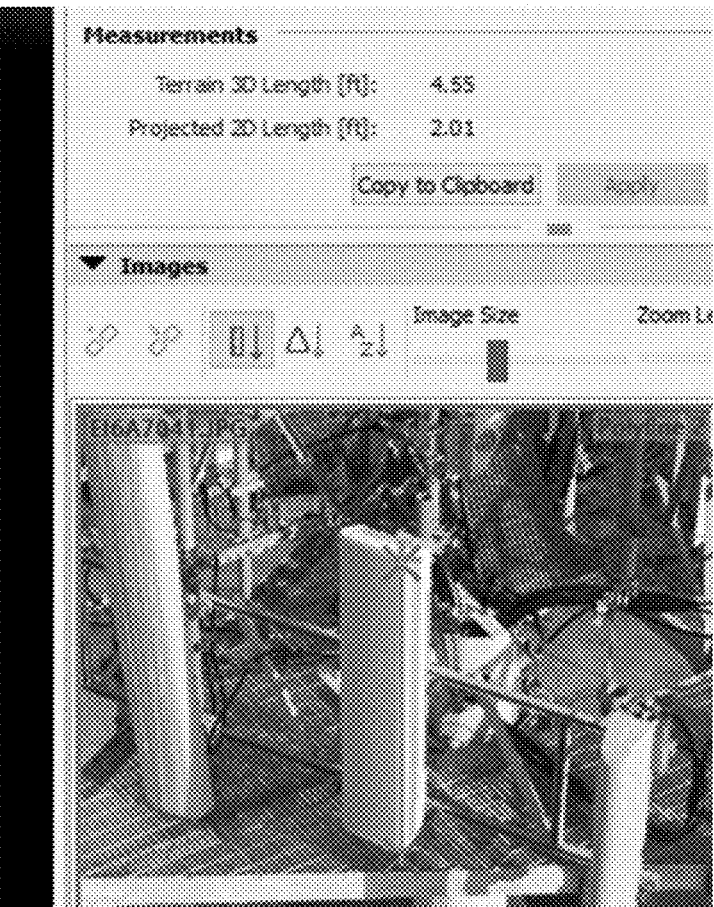
_FIG. 7_
_FIG. 8_

Figure 19:
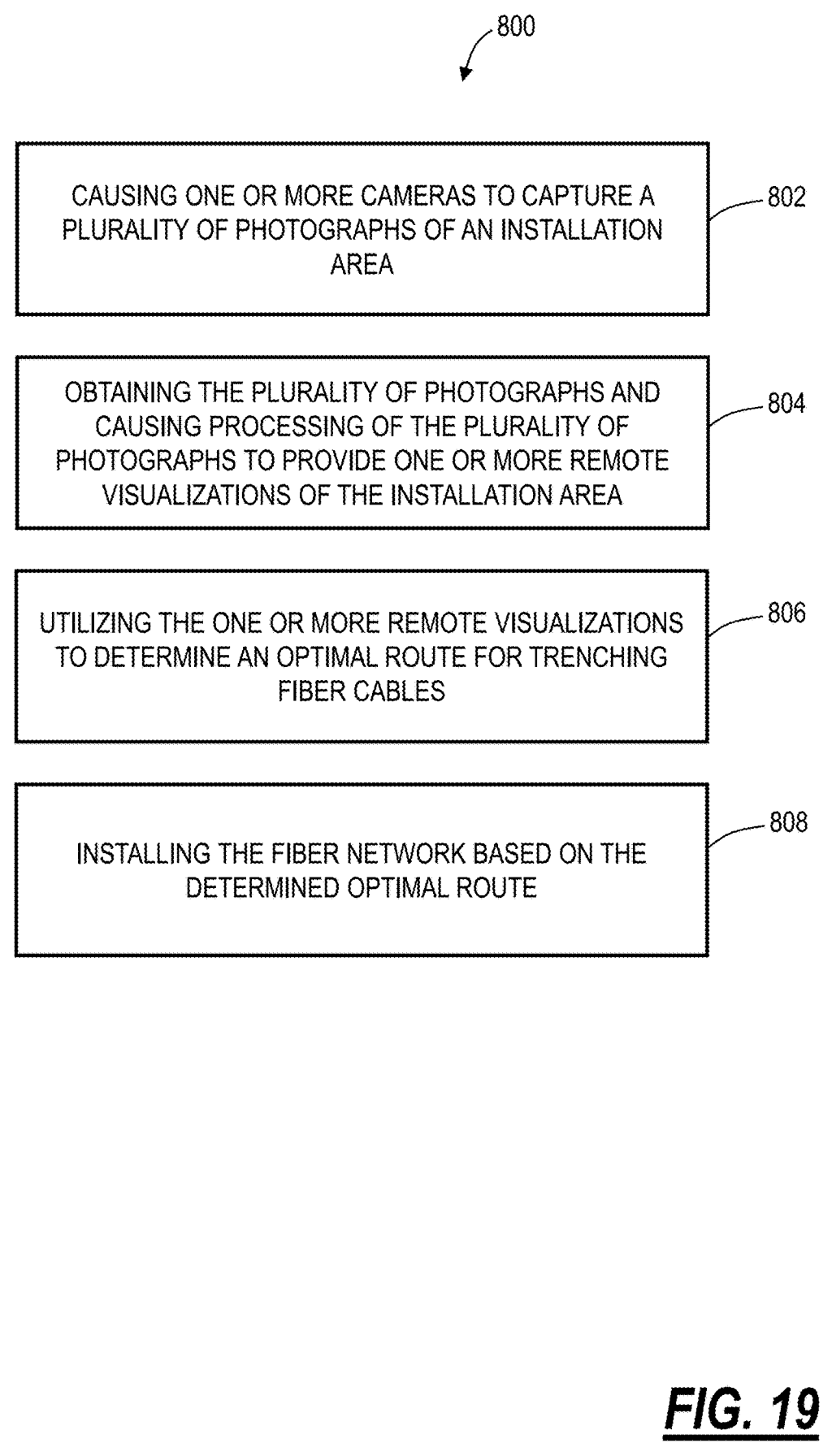

800

CAUSING ONE OR MORE CAMERAS TO CAPTURE A
PLURALITY OF PHOTOGRAPHS OF AN INSTALLATION
AREA — 802

OBTAINING THE PLURALITY OF PHOTOGRAPHS AND
CAUSING PROCESSING OF THE PLURALITY OF
PHOTOGRAPHS TO PROVIDE ONE OR MORE REMOTE
VISUALIZATIONS OF THE INSTALLATION AREA — 804

UTILIZING THE ONE OR MORE REMOTE VISUALIZATIONS
TO DETERMINE AN OPTIMAL ROUTE FOR TRENCHING
FIBER CABLES — 806

INSTALLING THE FIBER NETWORK BASED ON THE
DETERMINED OPTIMAL ROUTE — 808

Figure 20:
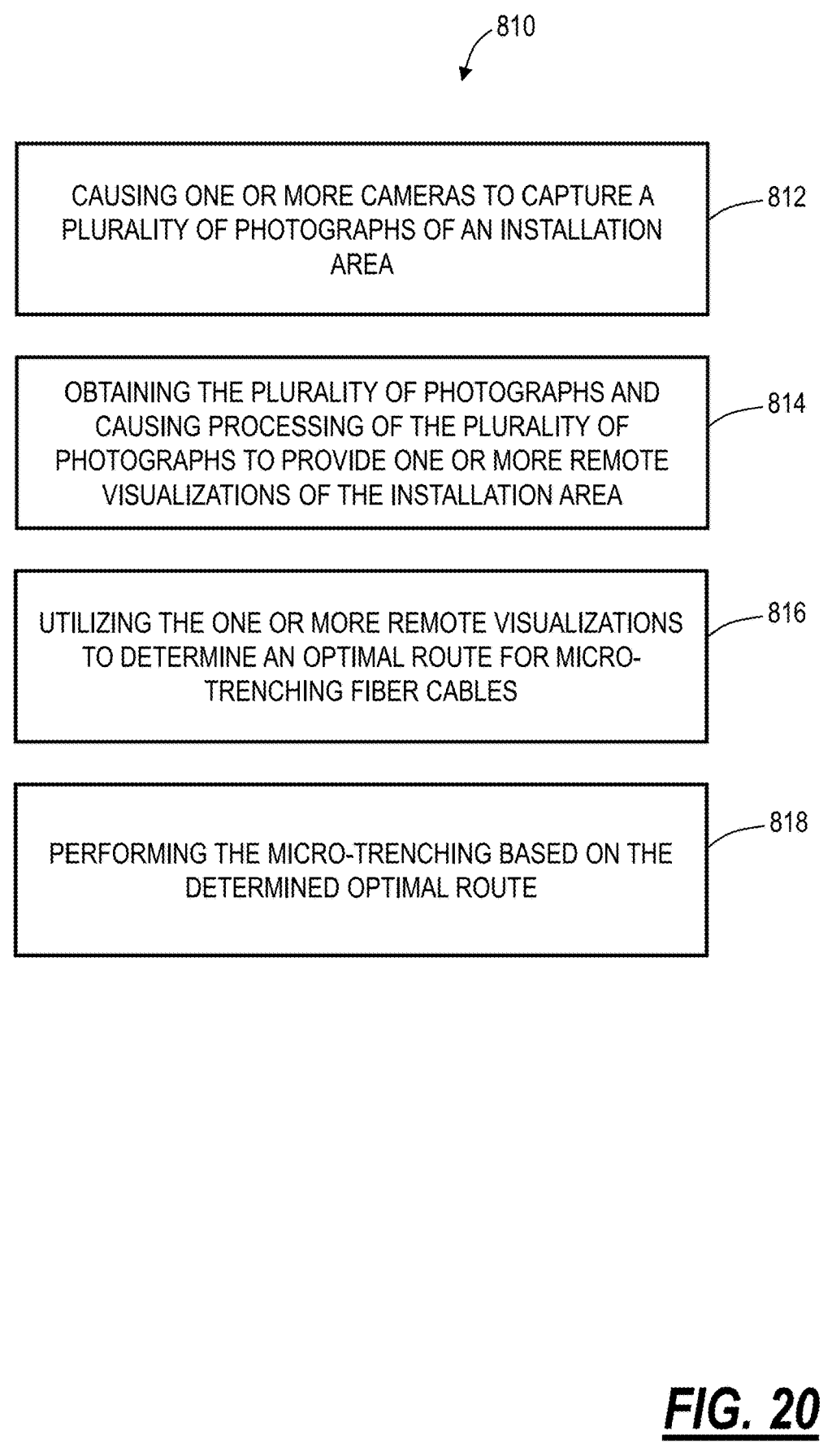

CAUSING ONE OR MORE CAMERAS TO CAPTURE A PLURALITY OF PHOTOGRAPHS OF AN INSTALLATION AREA — 812

OBTAINING THE PLURALITY OF PHOTOGRAPHS AND CAUSING PROCESSING OF THE PLURALITY OF PHOTOGRAPHS TO PROVIDE ONE OR MORE REMOTE VISUALIZATIONS OF THE INSTALLATION AREA — 814

UTILIZING THE ONE OR MORE REMOTE VISUALIZATIONS TO DETERMINE AN OPTIMAL ROUTE FOR MICRO-TRENCHING FIBER CABLES — 816

PERFORMING THE MICRO-TRENCHING BASED ON THE DETERMINED OPTIMAL ROUTE — 818

Figure 21:
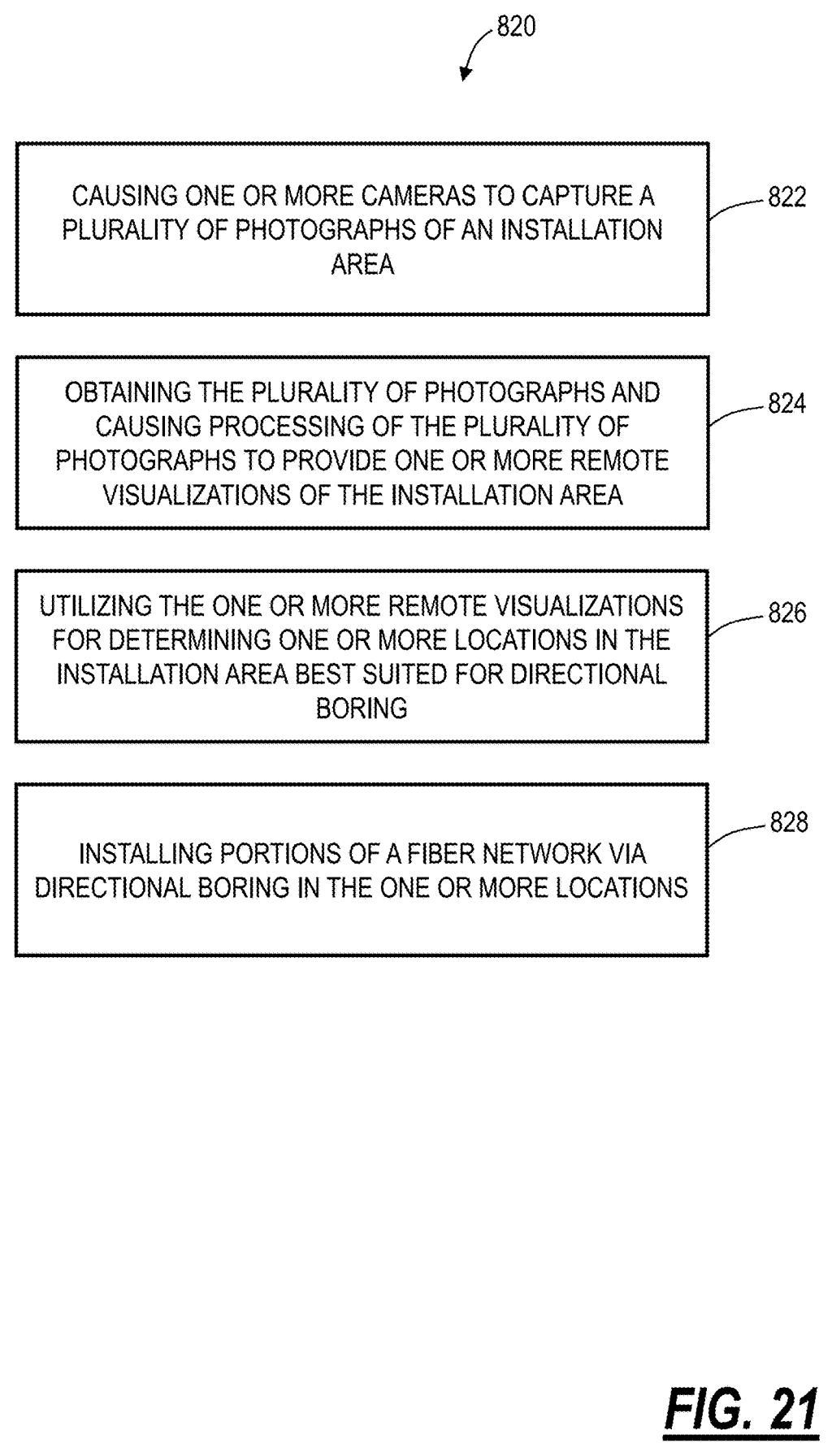

```
┌─────────────────────────────────────────┐
│ CAUSING ONE OR MORE CAMERAS TO CAPTURE A │ ─ 822
│ PLURALITY OF PHOTOGRAPHS OF AN INSTALLATION│
│                  AREA                     │
└─────────────────────────────────────────┘

┌─────────────────────────────────────────┐
│ OBTAINING THE PLURALITY OF PHOTOGRAPHS AND │ ─ 824
│ CAUSING PROCESSING OF THE PLURALITY OF    │
│ PHOTOGRAPHS TO PROVIDE ONE OR MORE REMOTE │
│ VISUALIZATIONS OF THE INSTALLATION AREA   │
└─────────────────────────────────────────┘

┌─────────────────────────────────────────┐
│ UTILIZING THE ONE OR MORE REMOTE VISUALIZATIONS│ ─ 826
│ FOR DETERMINING ONE OR MORE LOCATIONS IN THE  │
│ INSTALLATION AREA BEST SUITED FOR DIRECTIONAL │
│                  BORING                   │
└─────────────────────────────────────────┘

┌─────────────────────────────────────────┐
│ INSTALLING PORTIONS OF A FIBER NETWORK VIA │ ─ 828
│ DIRECTIONAL BORING IN THE ONE OR MORE LOCATIONS│
└─────────────────────────────────────────┘
```

Figure 22:
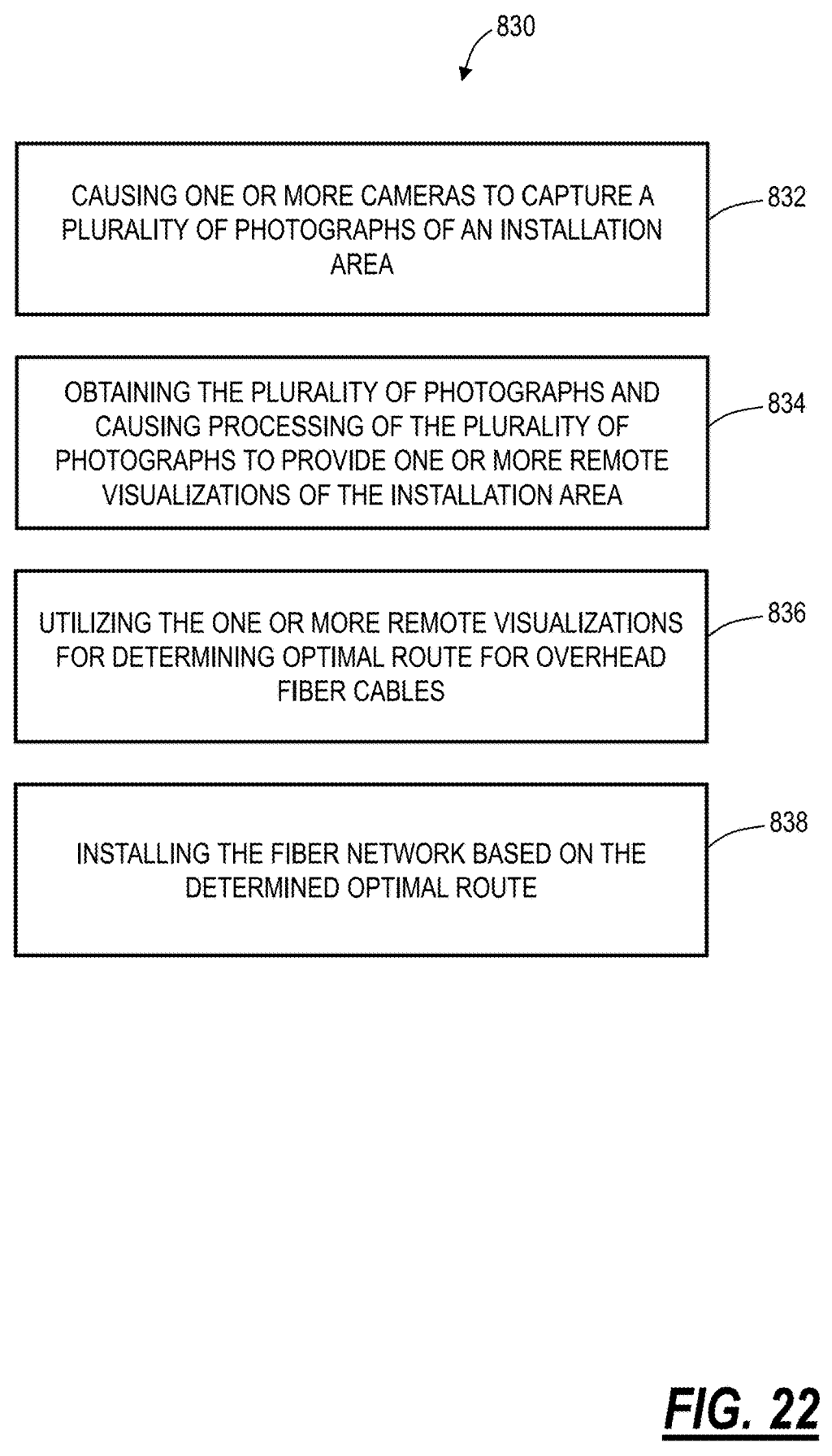

CAUSING ONE OR MORE CAMERAS TO CAPTURE A PLURALITY OF PHOTOGRAPHS OF AN INSTALLATION AREA — 832

OBTAINING THE PLURALITY OF PHOTOGRAPHS AND CAUSING PROCESSING OF THE PLURALITY OF PHOTOGRAPHS TO PROVIDE ONE OR MORE REMOTE VISUALIZATIONS OF THE INSTALLATION AREA — 834

UTILIZING THE ONE OR MORE REMOTE VISUALIZATIONS FOR DETERMINING OPTIMAL ROUTE FOR OVERHEAD FIBER CABLES — 836

INSTALLING THE FIBER NETWORK BASED ON THE DETERMINED OPTIMAL ROUTE — 838

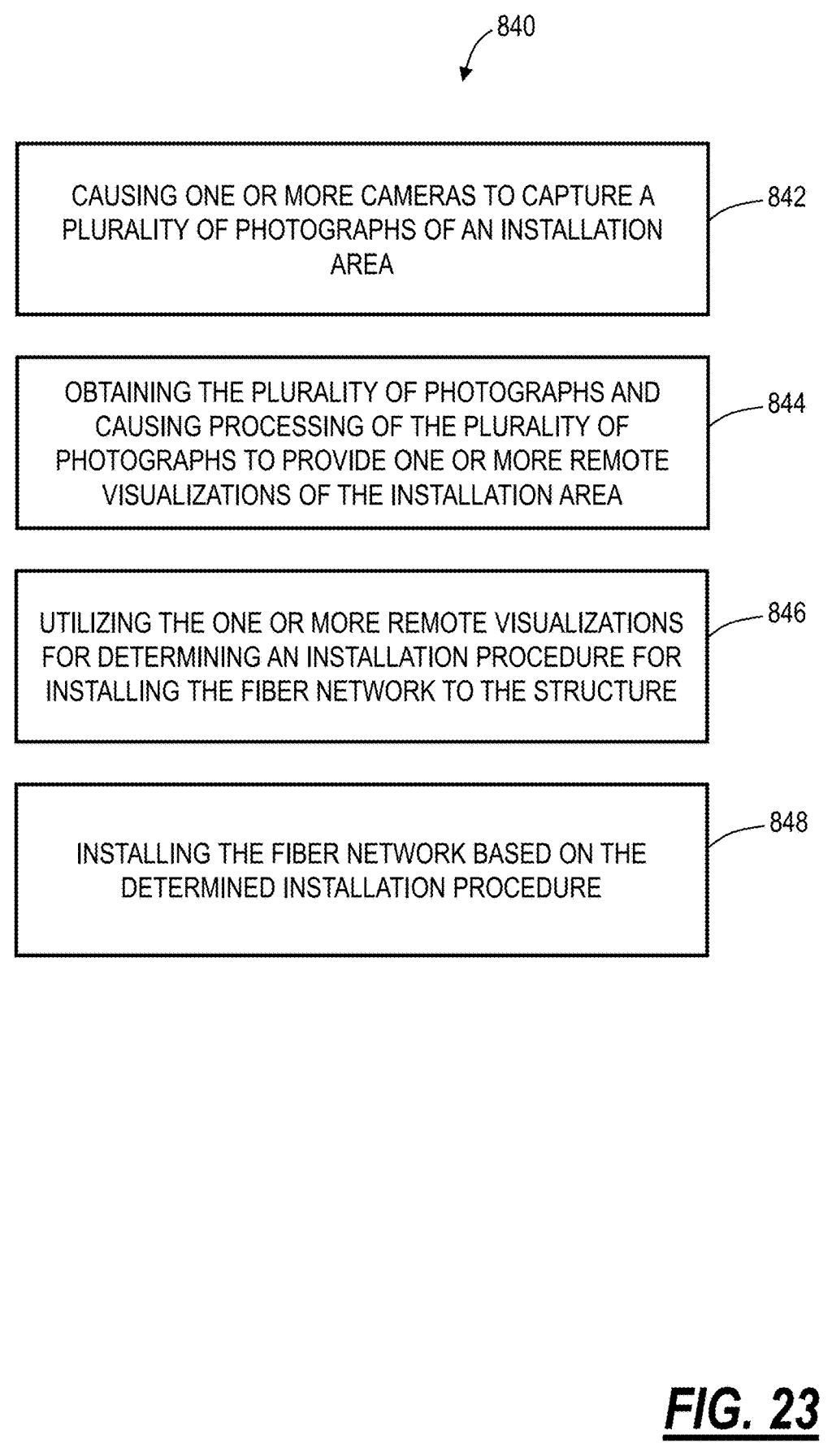

CAUSING ONE OR MORE CAMERAS TO CAPTURE A PLURALITY OF PHOTOGRAPHS OF AN INSTALLATION AREA — 842

OBTAINING THE PLURALITY OF PHOTOGRAPHS AND CAUSING PROCESSING OF THE PLURALITY OF PHOTOGRAPHS TO PROVIDE ONE OR MORE REMOTE VISUALIZATIONS OF THE INSTALLATION AREA — 844

UTILIZING THE ONE OR MORE REMOTE VISUALIZATIONS FOR DETERMINING AN INSTALLATION PROCEDURE FOR INSTALLING THE FIBER NETWORK TO THE STRUCTURE — 846

INSTALLING THE FIBER NETWORK BASED ON THE DETERMINED INSTALLATION PROCEDURE — 848

*FIG. 23*

SYSTEMS AND METHODS FOR UTILIZING REMOTE VISUALIZATION FOR INSTALLING FIBER NETWORKS

FIELD OF THE DISCLOSURE

The present disclosure relates generally to cellular site device installation and auditing systems and methods. More particularly, the present disclosure relates to systems and methods for utilizing remote visualization for installing fiber networks.

BACKGROUND OF THE DISCLOSURE

To provide high speed connectivity to infrastructure, homes, businesses, etc., fiber optic networks are being constructed globally. These networks can be constructed in a variety of ways including laying underground fiber cables, installing aerial fiber cables, and any combination thereof. At an average installation cost of $1,000 to $1,250 per residential household passed or $60,000 to $80,000 per mile, it is crucial for such installation projects to be thoughtfully and optimally planned out. The present disclosure provides systems and methods for utilizing one or more remote visualization techniques in the fiber network installation process. The various remote visualization techniques allow for detailed network planning and optimization of construction methods to reduce costs associated with fiber network construction.

BRIEF SUMMARY OF THE DISCLOSURE

In an embodiment, a method for installing a fiber network includes causing one or more cameras to capture a plurality of photographs of an installation area; obtaining the plurality of photographs and causing processing of the plurality of photographs to provide one or more remote visualizations of the installation area; utilizing the one or more remote visualizations to determine an optimal route for trenching fiber cables; and installing the fiber network based on the determined optimal route.

The steps can further include wherein the optimal route includes a combination of underground and overhead fiber cables. The installation area can include any of a highway system, a neighborhood, an intersection, a business park, and one or more buildings. The determining can include determining one or more locations for installing splice locations in the fiber network. The processing can include processing the plurality of photographs to define a three dimensional (3D) model of the installation area based on one or more location identifiers and one or more objects of interest in the plurality of photographs. The steps can include causing the one or more cameras to capture a 360 degree view of the installation area. Causing the one or more cameras to capture a plurality of photographs can include causing an Unmanned Aerial Vehicle (UAV) to fly a flight path over the installation area and capture the plurality of photographs. The plurality of photographs can be obtained from a combination of an Unmanned Aerial Vehicle (UAV) and one or more camera systems. Determining an optimal route can include, based on the one or more remote visualizations, determining a route which includes a shortest trenching distance for installing the fiber network. Causing the one or more cameras to capture a plurality of photographs can be performed remotely. The steps can further include, after the installing, performing a virtual site inspection of the fiber network. Performing a virtual site inspection of the fiber network can include causing the one or more cameras to capture a plurality of photographs of the installation area after the installation is completed. The steps can include providing a close-out package, wherein the close-out package provides verification of the fiber network installation.

BRIEF DESCRIPTION OF THE DRAWINGS

The present disclosure is illustrated and described herein with reference to the various drawings, in which like reference numbers are used to denote like system components/method steps, as appropriate, and in which:

FIGS. 6-11 are various screenshots of GUIs associated with a 3D model of a site based on photos taken from the UAV as described herein.

FIG. 19 is a flowchart of a process for installing a fiber network.

FIG. 20 is a flowchart of a process for installing a fiber network via micro-trenching.

FIG. 21 is a flowchart of a process for utilizing directional boring in fiber network installations.

FIG. 22 is a flowchart of a process for installing overhead fiber networks.

FIG. 23 is a flowchart of a process for installing a fiber network to a structure.

DETAILED DESCRIPTION OF THE DISCLOSURE

Exemplary Hardware

Figure 1:
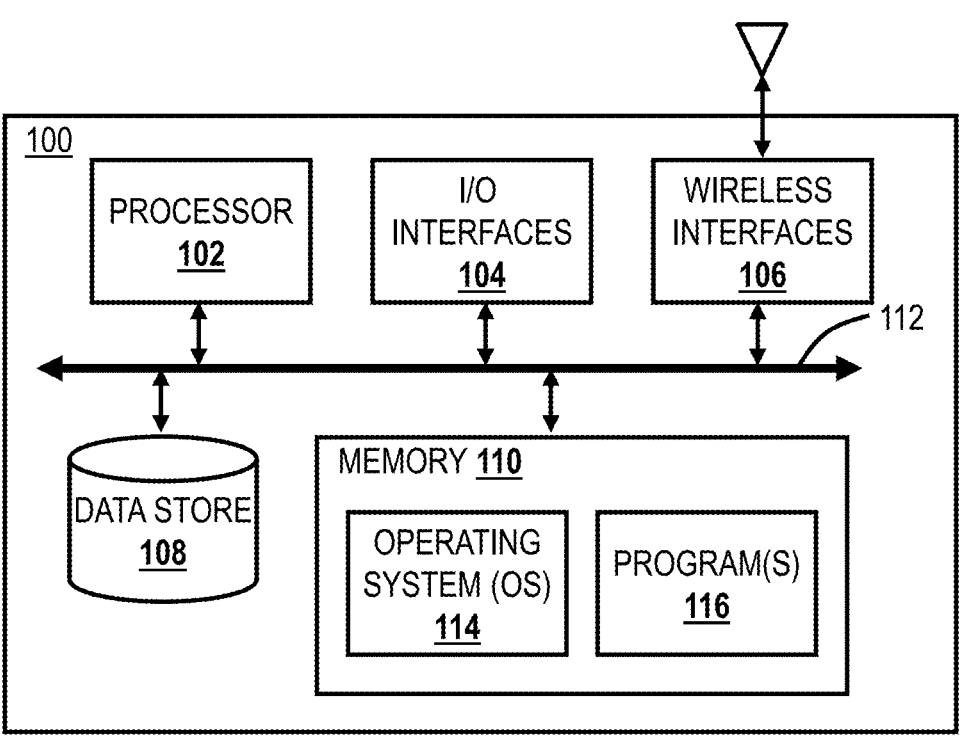
FIG. 1 is a block diagram of a mobile device.

Referring to FIG. 1, in an exemplary embodiment, a block diagram illustrates a mobile device 100, which may be used for a site inspection or the like. The mobile device 100 can be a digital device that, in terms of hardware architecture, generally includes a processor 102, input/output (I/O) interfaces 104, wireless interfaces 106, a data store 108, and memory 110. It should be appreciated by those of ordinary skill in the art that FIG. 1 depicts the mobile device 100 in an oversimplified manner, and a practical embodiment may include additional components and suitably configured processing logic to support known or conventional operating features that are not described in detail herein. The components (102, 104, 106, 108, and 102) are communicatively coupled via a local interface 112. The local interface 112 can be, for example, but not limited to, one or more buses or other wired or wireless connections, as is known in the art. The local interface 112 can have additional elements, which are omitted for simplicity, such as controllers, buffers (caches), drivers, repeaters, and receivers, among many others, to enable communications. Further, the local interface 112 may include address, control, and/or data connections to enable appropriate communications among the aforementioned components.

The processor 102 is a hardware device for executing software instructions. The processor 102 can be any custom made or commercially available processor, a central processing unit (CPU), an auxiliary processor among several processors associated with the mobile device 100, a semiconductor-based microprocessor (in the form of a microchip or chip set), or generally any device for executing software instructions. When the mobile device 100 is in operation, the processor 102 is configured to execute software stored within the memory 110, to communicate data to and from the memory 110, and to generally control operations of the mobile device 100 pursuant to the software instructions. In an exemplary embodiment, the processor 102 may include a mobile-optimized processor such as optimized for power consumption and mobile applications. The I/O interfaces 104 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 104 can also include, for example, a serial port, a parallel port, a small computer system interface (SCSI), an infrared (IR) interface, a radio frequency (RF) interface, a universal serial bus (USB) interface, and the like. The I/O interfaces 104 can include a graphical user interface (GUI) that enables a user to interact with the mobile device 100. Additionally, the I/O interfaces 104 may further include an imaging device, i.e., camera, video camera, etc.

The wireless interfaces 106 enable wireless communication to an external access device or network. Any number of suitable wireless data communication protocols, techniques, or methodologies can be supported by the wireless interfaces 106, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 106 can be used to communicate with a UAV for command and control as well as to relay data therebetween. The data store 108 may be used to store data. The data store 108 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 108 may incorporate electronic, magnetic, optical, and/or other types of storage media.

The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 110 may incorporate electronic, magnetic, optical, and/or other types of storage media. Note that the memory 110 may have a distributed architecture, where various components are situated remotely from one another but can be accessed by the processor 102. The software in memory 110 can include one or more software programs, each of which includes an ordered listing of executable instructions for implementing logical functions. In the example of FIG. 1, the software in the memory 110 includes a suitable operating system (O/S) 114 and programs 116. The operating system 114 essentially controls the execution of other computer programs and provides scheduling, input-output control, file and data management, memory management, and communication control and related services. The programs 116 may include various applications, add-ons, etc. configured to provide end-user functionality with the mobile device 100, including performing various aspects of the systems and methods described herein.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, the software can include instructions executable by a processor that, in response to such execution, cause a processor or any other circuitry to perform a set of operations, steps, methods, processes, algorithms, etc.

Photo Collections

As part of a site inspection generally, camera systems and/or the mobile device 100 can be used to document various aspects of the site by taking photos or video. For example, the camera systems and mobile device 100 can be used to take photos or video on the ground and in or around structures. Further, a UAV can be used to take aerial photos or video of the site or of the site components. The photos and video can be stored in any of a UAV, the mobile device 100, the cloud, the camera system, etc.

Data Capture-Site Inspection

Cameras can be used to capture various pieces of data. That is, a camera is equivalent to an engineer/technician's own eyes, thereby eliminating the need for the engineer/technician to physically be present at the site or inspect an installation at the site. One important aspect of the site inspection is physically collecting various pieces of information-either to check records for consistency or to establish a record. For example, the data capture can include determining equipment module types, locations, connectivity, serial numbers, component tags, etc. from photos. The data capture can include determining physical dimensions from photos or from GPS such as dimensions of a structure or installation area including height, width, depth, etc. The data capture can also include visual inspection of any aspect of the site. including, but not limited to, physical characteristics, mechanical connectivity, cable connectivity, and the like.

3D Modeling

To develop a 3D model, cameras are configured to take various photos, at different angles, orientations, heights, etc. to develop a 360-degree view. For post-processing, it is important to differentiate between different photos accurately. In various exemplary embodiments, the systems and methods utilize accurate location tracking for each photo taken. It is important for accurate correlation between photos to enable construction of a 3D model from a plurality of 2D photos. The photos can all include multiple location identifiers (i.e., where the photo was taken from, height, and exact location). In an exemplary embodiment, the photos can each include at least two distinct location identifiers, such as from GPS or GLONASS. GLONASS is a "GLObal NAvigation Satellite System" which is a space-based satellite navigation system operating in the radio navigation-satellite service and used by the Russian Aerospace Defense Forces. It provides an alternative to GPS and is the second alternative navigational system in operation with global coverage and of comparable precision. The location identifiers are tagged or embedded to each photo and indicative of the location of the camera and where and when the photo was taken. These location identifiers are used with objects of interest identified in the photo during post-processing to create the 3D model.

During the photo capture, cameras are configured to take various photos of different aspects of the site including structures as well as surrounding areas. These photos are each tagged or embedded with multiple location identifiers. The cameras can take hundreds or even thousands of photos, each with the appropriate location identifiers. For an accurate 3D model, at least hundreds of photos are required. The photos can be manually taken based on operator commands. Of course, a combination of automated capture and manual capture is also contemplated.

Figure 2:
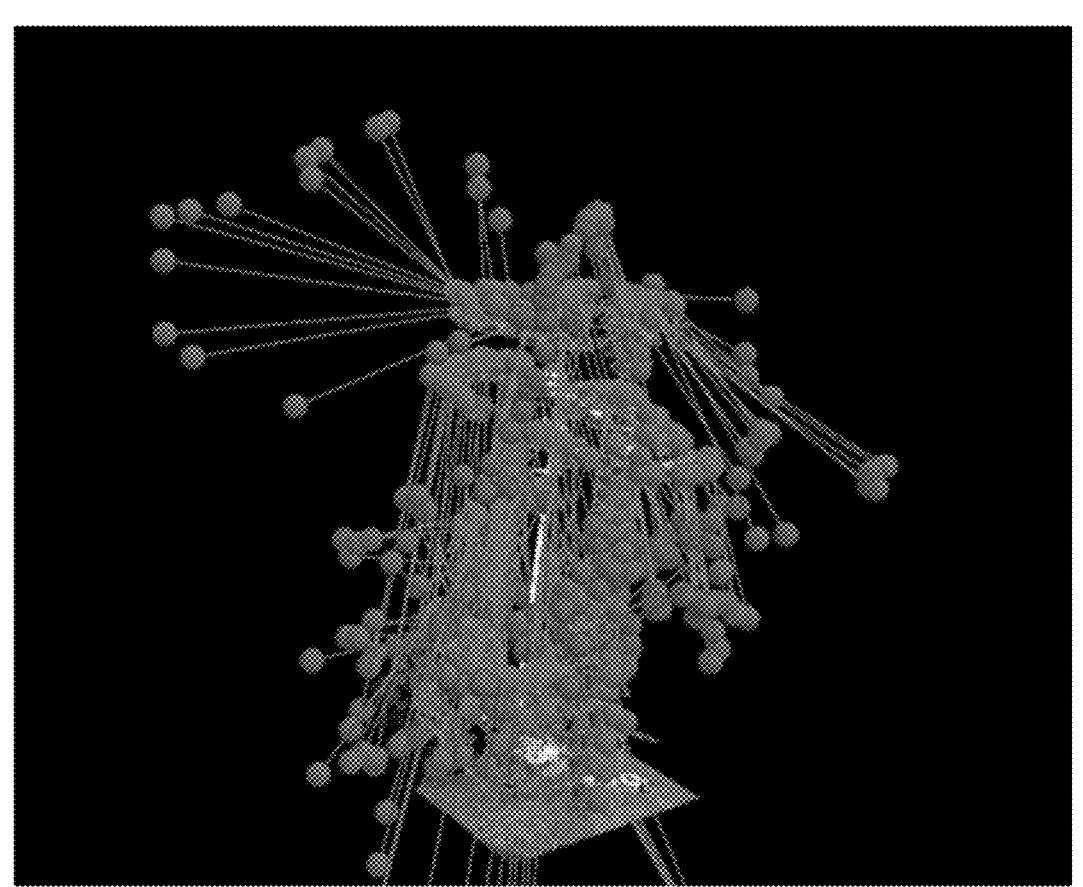
FIG. 2 is a side view of an exemplary flight of the UAV at a site.

Referring to FIG. 2, in an exemplary embodiment, a side view illustrates an exemplary flight of a UAV at a site, the site in this example being a cell site. FIG. 2 shows circles in the side view at locations where photos were taken. Note, photos are taken at different elevations, orientations, angles, and locations.

The photos can be stored locally in the UAV and/or transmitted wirelessly to a mobile device, controller, server, etc. Once the flight is complete, and the photos are provided to an external device from the UAV (e.g., mobile device, controller, server, cloud service, or the like), post-processing occurs to combine the photos or "stitch" them together to construct the 3D model. While described separately, the post-processing could occur in the UAV provided its computing power is capable.

Figure 3:
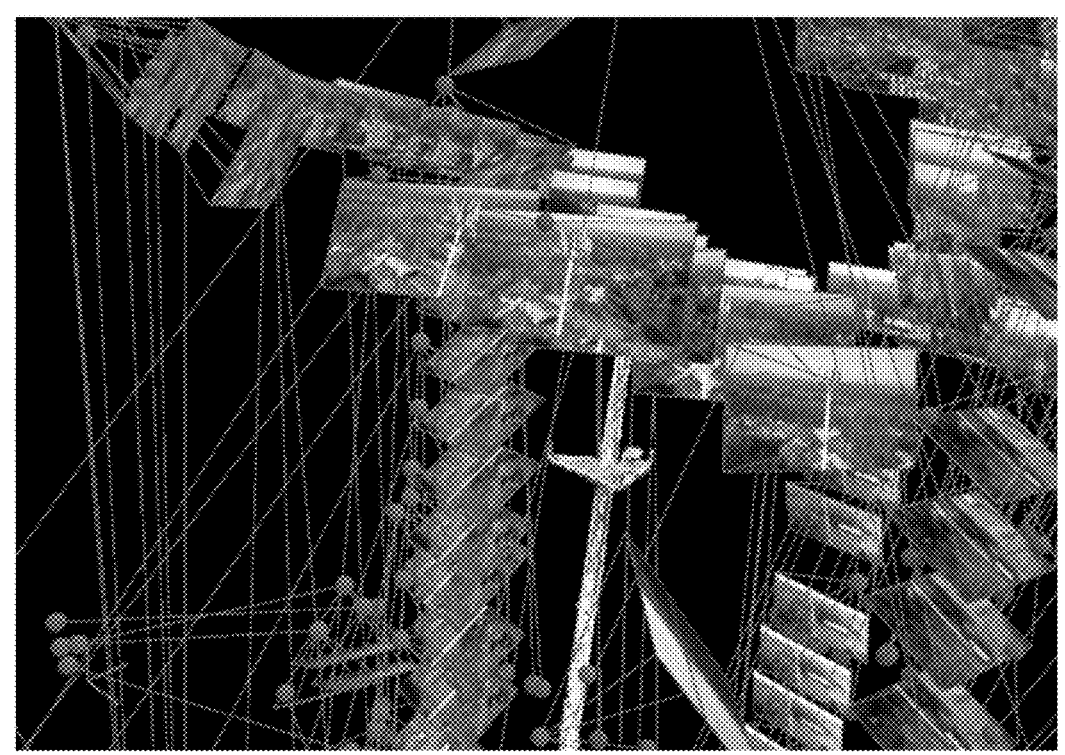
FIG. 3 is a logical diagram of a portion of a tower along with associated photos taken by the UAV at different points relative thereto.

Referring to FIG. 3, in an exemplary embodiment, a logical diagram illustrates a portion of a tower along with associated photos taken by a UAV at different points relative thereto. Specifically, various 2D photos are logically shown at different locations relative to the tower to illustrate the location identifiers and the stitching together of the photos.

Figure 4:
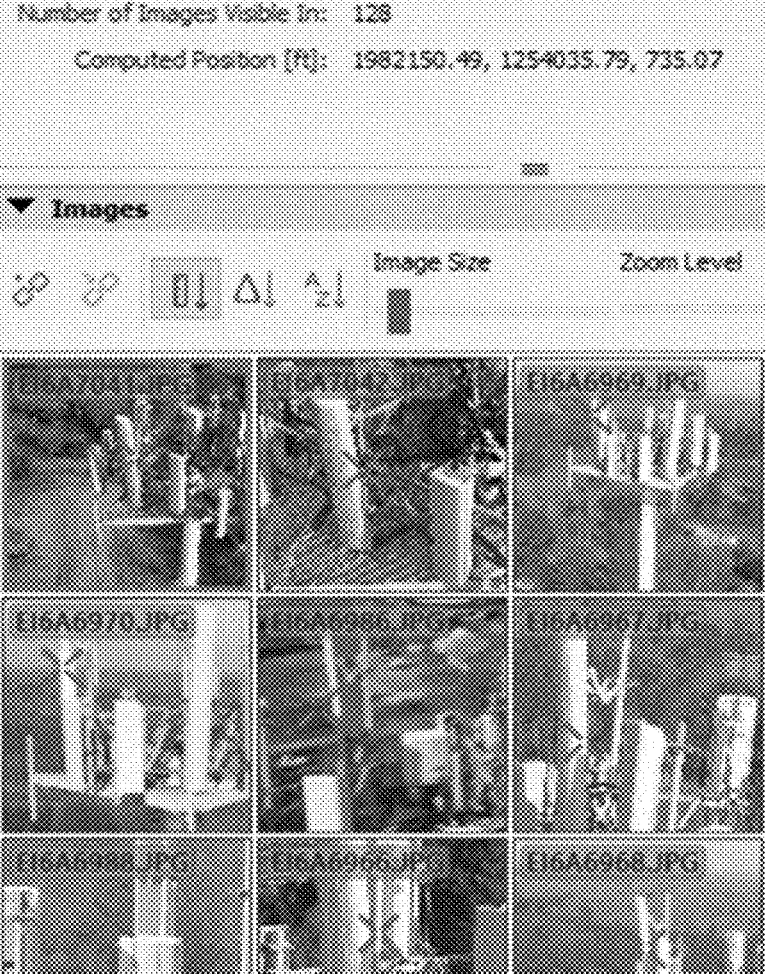
FIG. 4 is a screenshot of a GUI associated with post-processing photos from the UAV.

Referring to FIG. 4, in an exemplary embodiment, a screen shot illustrates a Graphic User Interface (GUI) associated with post-processing photos from the UAV. Again, once the UAV has completed taking photos of the site, the photos are post-processed to form a 3D model. The systems and methods contemplate any software program capable of performing photogrammetry. In the example of FIG. 4, there are 128 total photos. The post-processing includes identifying visible points across the multiple points, i.e., objects of interest. For example, the objects of interest can be any of the site components, landmarks, pre-designated markers, etc. The post-processing identifies the same object of interest across different photos, with their corresponding location identifiers, and builds a 3D model based on the plurality of 2D photos.

Figure 5:
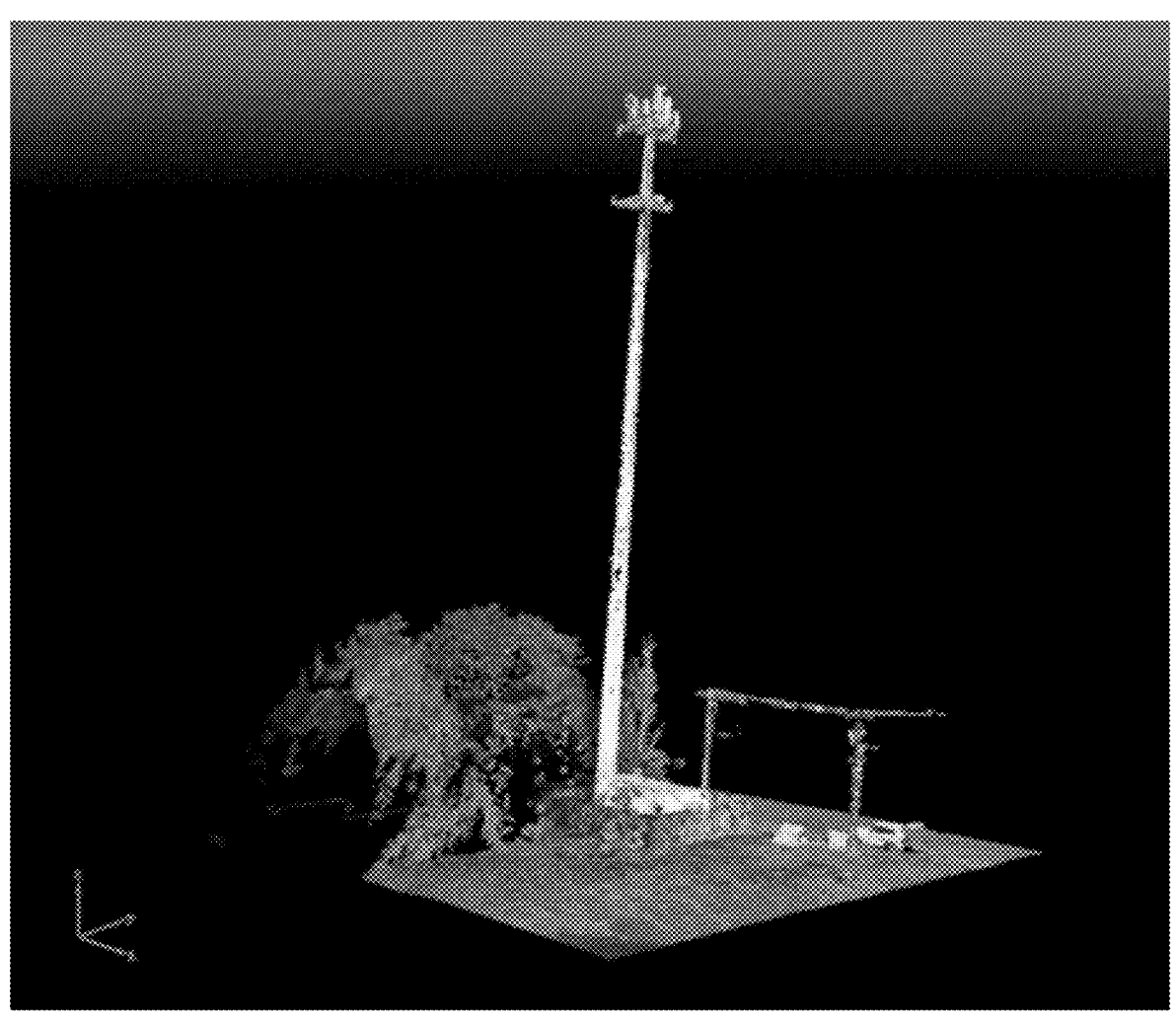
FIG. 5 is a screenshot of a 3D model constructed from a plurality of 2D photos taken from the UAV as described herein.

Referring to FIG. 5, in an exemplary embodiment, a screen shot illustrates a 3D model constructed from a plurality of 2D photos taken from the UAV as described herein. Note, the 3D model can be displayed on a computer or another type of processing device, such as via an application, a Web browser, or the like. The 3D model supports zoom, pan, tilt, etc. It is also contemplated that the plurality of 2D photos can originate from any of the UAV, other camera systems, handheld cameras, mobile devices, etc.

Figure 6:
Figure 6:
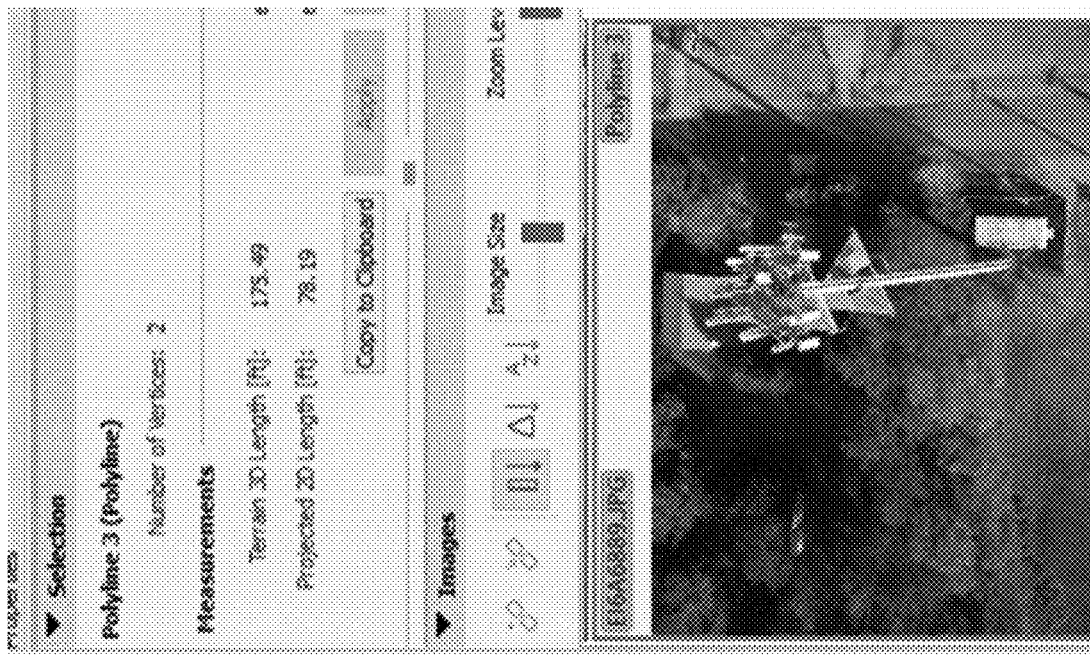
Figure 6:
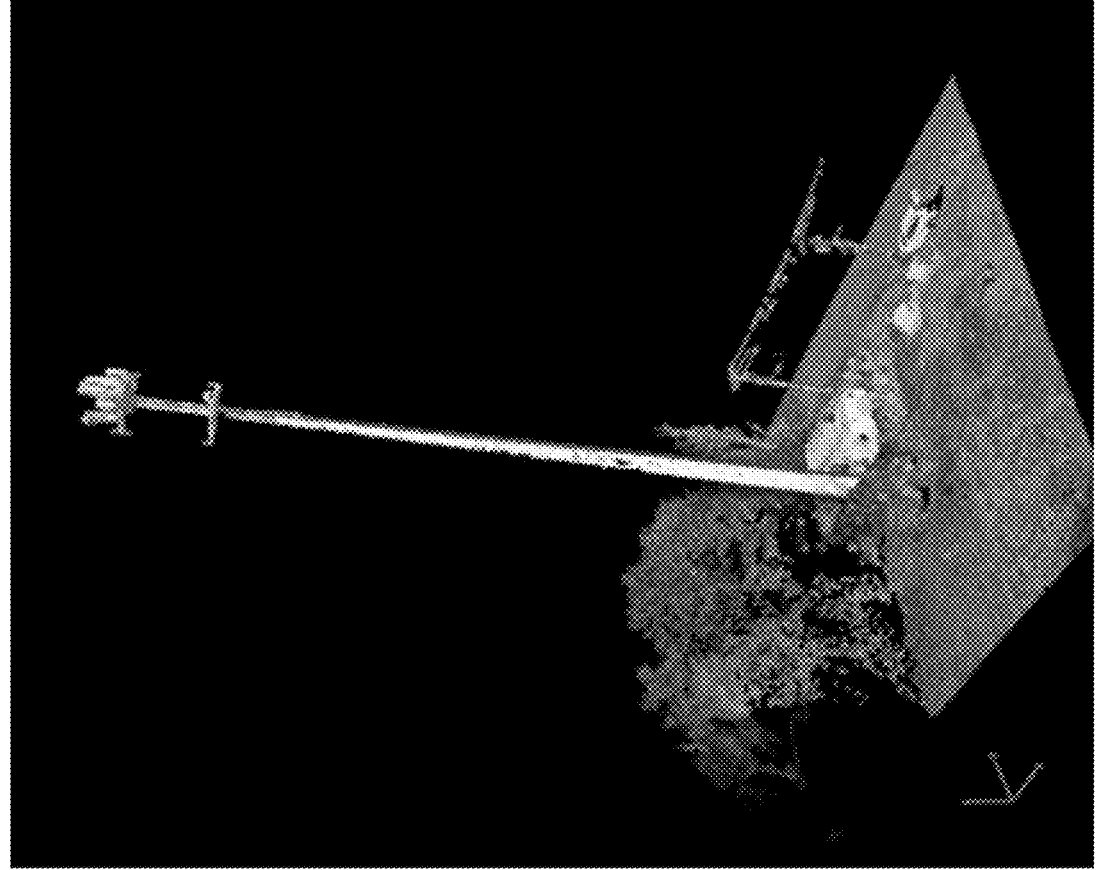
Figure 9:

Referring to FIGS. 6-11, in various exemplary embodiments, various screenshots illustrate GUIs associated with a 3D model of a site based on photos taken from a UAV and/or camera system as described herein. FIG. 6 is a GUI illustrating an exemplary measurement of an object, i.e., a tower associated with a site, in the 3D model. Specifically, using a point and click operation, one can click on two points such as the top and bottom of the tower and the 3D model can provide a measurement, e.g., 175' in this example. Similar operations are contemplated for providing measurements of other site components such as a distance across the ground, a depth, etc. FIG. 7 illustrates a close-up view of the tower highlighting a component such as an antenna and a similar measurement made thereon using point and click, e.g., 4.55' in this example. FIGS. 8 and 9 illustrate an aerial view in the 3D model showing surrounding geography around the site. From these views, structures are illustrated with the surrounding environment. Specifically, the 3D model can assist in determining an impact of an installation, i.e., a fiber installation. Appropriate considerations can be made based thereon.

Figure 10:
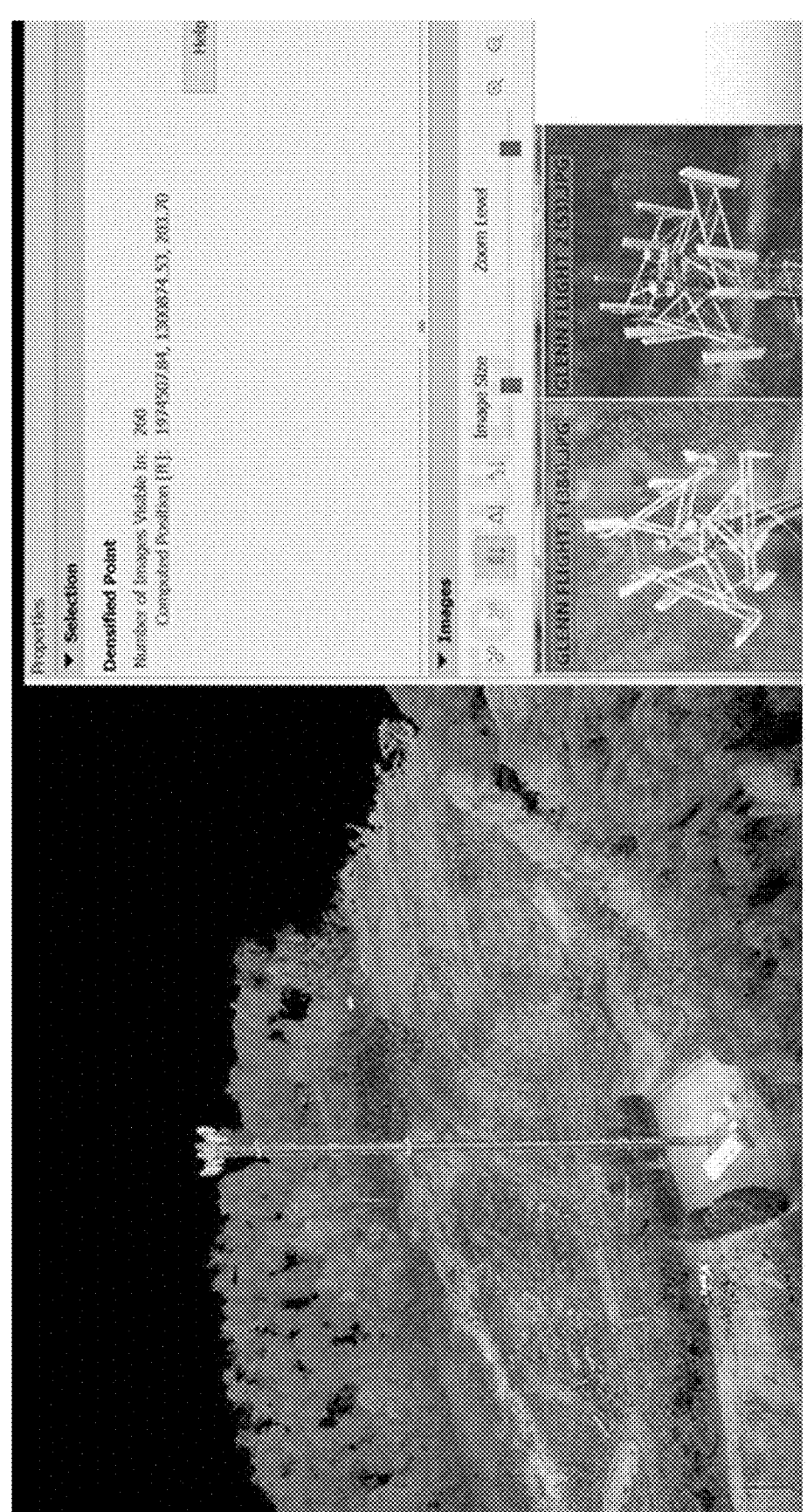
Figure 11:

FIGS. 10 and 11 illustrate the 3D model and associated photos on the right side of the GUI. One useful aspect of the 3D model GUI is an ability to click anywhere on the 3D model and bring up corresponding 2D photos. Here, an operator can click anywhere and bring up full-sized photos of the area. Thus, with the systems and methods described herein, the 3D model can measure and map the site and surrounding geography along with structures, components, etc. to form a comprehensive 3D model. There are various uses of the 3D model to perform site inspections including checking installation tracks, sizing and placement of fiber, and other site components; providing engineering drawings; determining characteristics; and the like.

It will be appreciated that the various steps and methods described herein include capturing and processing photos in a similar manner for an interior of a structure of the site. In various embodiments, various camera systems are adapted to capture photos of the interior of structures similar to the UAV.

Figure 12:
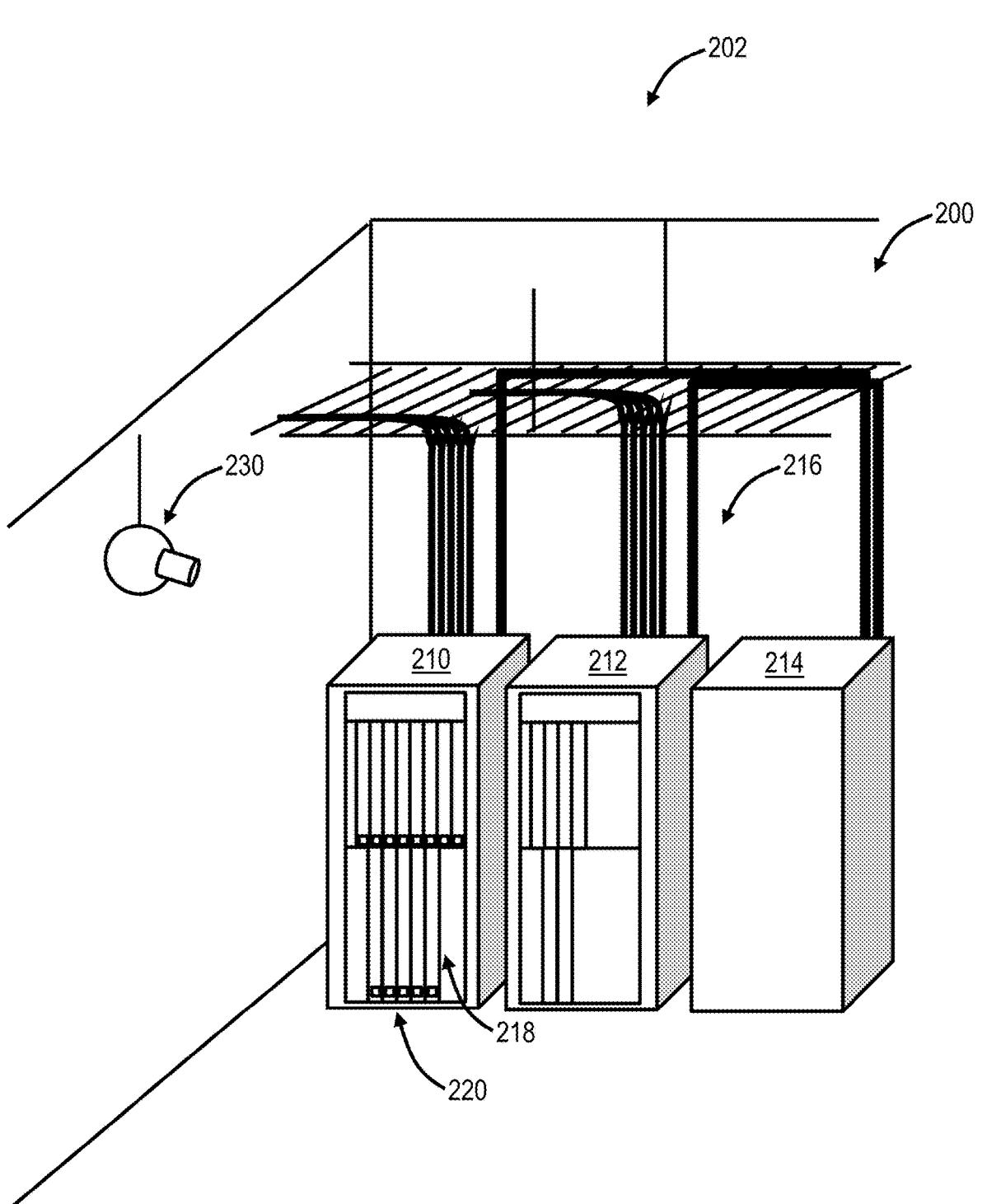
FIG. 12 is a diagram of an exemplary interior of a building at a site.

The above description explains 3D modeling and photo data capture using a UAV. Additionally, the photo data capture can be through other means, including portable cameras, fixed cameras, heads-up displays (HUD), head-mounted cameras, and the like. That is the systems and methods described herein contemplate the data capture through any available technique. The UAV will be difficult to obtain photos inside buildings, i.e., a residence or business place. Referring to FIG. 12, in an exemplary embodiment, a diagram illustrates an exemplary interior 200 of a building 202, such as a shelter or cabinet, at the site, in this example, a cell site. Generally, the building 202 houses equipment associated with the site such as wireless RF terminals 210 (e.g., LTE terminals), wireless backhaul equipment 212, power distribution 214, and the like. Generally, wireless RF terminals 210 connect to the site components for providing associated wireless service. The wireless backhaul equipment 212 includes networking equipment to bring the associated wireless service signals to a wireline network, such as via fiber optics or the like. The power distribution 214 provides power for all of the equipment such as from the grid as well as a battery backup to enable operation in the event of power failures. Of course, additional equipment and functionality are contemplated in the interior 200.

The terminals 210, equipment 212, and the power distribution 214 can be realized as rack or frame mounted hardware with cabling 216 and with associated modules 218. The modules 218 can be pluggable modules which are selectively inserted in the hardware and each can include unique identifiers 220 such as barcodes, Quick Response (QR) codes, RF Identification (RFID), physical labeling, color coding, or the like. Each module 218 can be unique with a serial number, part number, and/or functional identifier. The modules 218 are configured as needed to provide the associated functionality of the site.

The systems and methods include, in addition to or instead of the aforementioned photo capture via the UAV, photo data capture in the interior 200 for 3D modeling and for virtual site inspections. The photo data capture can be performed by a fixed, rotatable camera 230 located in the interior 200. The camera 230 can be communicatively coupled to a Data Communication Network (DCN), such as through the wireless backhaul equipment 212 or the like. The camera 230 can be remotely controlled, such as by an engineer performing a site survey from his or her office. Other techniques of photo data capture can include an on-site technician taking photos with a camera and uploading them to a cloud service or the like. Again, the systems and methods contemplate any type of data capture.

Again, with a plurality of photos, e.g., hundreds, it is possible to utilize photogrammetry to create a 3D model of the interior 200 (as well as a 3D model of the exterior as described above). The 3D model is created using physical cues in the photos to identify objects of interest, such as the modules 218, the unique identifiers 220, or the like.

It will be appreciated that the building 202 can be any structure associated with the site, and the interior 200 of such a building can include any components associated with an installation, for example, a fiber installation. In various embodiments, the building 202 can be in any location on the site, where the building can be any of a residence, a business place, a cell site shelter, etc. Further, various embodiments include capturing photo data in any number of buildings associated with a site, where a 3D model of a site includes the interiors and exteriors of all buildings associated with an installation.

Virtual Site Inspection

Virtual site inspections are associated with the site and utilize three-dimensional (3D) models for remote performance, i.e., at an office as opposed to in the field. The virtual site inspection process includes obtaining a plurality of photographs of a site including any structures present on the site, and one or more buildings and interiors thereof. Subsequent to the obtaining, steps can include processing the plurality of photographs to define a three dimensional (3D) model of the site based on one or more objects of interest in the plurality of photographs, and remotely performing a site inspection of the site utilizing a Graphical User Interface (GUI) of the 3D model to collect and obtain information about the site, structures, the one or more buildings, and the interiors thereof. The 3D model can be a combination of an exterior of the site including the structures and associated site components thereon, geography local to the site, and the interiors of the one or more buildings at the site. The 3D model can include detail at a module level in the interiors. The 3D model can also include only the interiors of the one or more buildings at the site.

The remotely performing of the site inspection can include determining equipment location on the ground, on structures, and in the interiors, measuring distances between structures (buildings) and within the buildings to determine actual spatial location. Further, steps can include determining connectivity between equipment based on associated cabling. The remotely performing the site inspection can include planning for one or more of new equipment and changes to existing equipment at the site through drag and drop operations in the GUI, wherein the GUI includes a library of equipment for the drag and drop operations; and, subsequent to the planning, providing a list of the one or more of the new equipment and the changes to the existing equipment based on the library, for implementation thereof. The remotely performing the site inspection can include providing one or more of the photographs of an associated area of the 3D model responsive to an operation in the GUI. The virtual site survey process can include rendering a texture map of the interiors responsive to an operation in the GUI. In various embodiments, new equipment can include fiber cabling to be installed at a site.

The virtual site inspection process can include performing an inventory of equipment at the site including site components and equipment in the interiors of buildings, wherein the inventory from the 3D model uniquely identifies each of the equipment based on associated unique identifiers. The remotely performing the site inspection can include providing an equipment visual in the GUI of all associated modules therein. The obtaining can include a UAV obtaining the photographs, and the one or more of a fixed and portable camera obtaining the photographs in an interior. The obtaining can be performed by an on-site technician at the site, while the site inspection can be remotely performed via the 3D model and associated photographs.

In another exemplary embodiment, an apparatus adapted to perform a virtual site inspection of a site utilizing three-dimensional (3D) models for remote performance includes a network interface and a processor communicatively coupled to one another; and memory storing instructions that, when executed, cause the processor to receive, via the network interface, a plurality of photographs of a site including one or more buildings and interiors thereof; process the plurality of photographs to define a three dimensional (3D) model of the site based on one or more objects of interest in the plurality of photographs, subsequent to receiving the photographs; and provide a GUI of the 3D model for remote performance of a site inspection of the site utilizing the 3D model to collect and obtain information about the site, the one or more buildings, and the interiors thereof.

In a further exemplary embodiment, a non-transitory computer readable medium includes instructions that, when executed, cause one or more processors to perform the steps described above. The virtual site inspection can perform anything remotely that traditionally would have required on-site presence, including various aspects of a site inspection described herein.

The 3D model can be utilized to automatically provide engineering drawings, such as responsive to the planning for new equipment or changes to existing equipment. Here, the GUI can have a library of equipment (e.g., approved equipment and vendor information can be periodically imported into the GUI). Normal drag and drop operations in the GUI can be used for equipment placement from the library. Also, the GUI system can include error checking, e.g., a particular piece of equipment is incompatible with placement or in violation of policies, and the like.

Close-Out Package Systems and Methods

A close-out package is created to document and verify the work performed at the site, including interiors of buildings. The systems and methods eliminate the need for a separate third-party inspection firm for the close-out package. The systems and methods include the installers (i.e., from the third-party installation firm, the owner, the operator, etc.) performing video capture subsequent to the installation and maintenance and using various techniques to obtain data from the video capture for the close-out package. The close-out package can be performed off-site with the data from the video capture thereby eliminating unnecessary site visits.

In an exemplary embodiment, a close-out package of a site can be performed subsequent to maintenance or installation work. The close-out package method includes, subsequent to the maintenance or installation work, obtaining video capture of site components associated with the work; subsequent to the video capture, processing the video capture to obtain data for the close-out package, wherein the processing comprises identifying the site components associated with the work; and creating a close-out package based on the processed video capture, wherein the close-out package provides verification of the maintenance or installation work and outlines that the maintenance or installation work was performed in a manner consistent with an operator or owner's guidelines.

The video capture can be performed by a mobile device and one or more of locally stored thereon and transmitted from the mobile device. The video capture can also be performed by a mobile device which wirelessly transmits a live video feed, and the video capture is remotely stored from the site. The video capture can also be performed by an Unmanned Aerial Vehicle (UAV) flown at the site and/or camera systems within buildings of the site. Further, the video capture can be a live video feed with two-way communication between an installer associated with the maintenance or installation work and personnel associated with the operator or owner to verify the maintenance or installation work. For example, the installer and the personnel can communicate to go through various items in the maintenance or installation work to check/audit the work.

The close-out package method can also include creating a three-dimensional (3D) model from the video capture; determining equipment location from the 3D model; measuring distances between the equipment and within the equipment to determine actual spatial location; and determining connectivity between the equipment based on associated cabling from the 3D model. The close-out audit method can also include uniquely identifying the site components from the video capture and distinguishing in the close-out package.

The close-out package method can also include identifying cabling and connectivity between the site components from the video capture and distinguishing in the close-out package. The close-out package method can also include checking a plurality of factors in the close-out package from the video capture compared to the operator or owner's guidelines. The close-out package method can also include checking the grounding components from the video capture, comparing the checked grounding to the operator or owner's guidelines and distinguishing in the close-out package. The close-out package method can also include checking mechanical connectivity of site components based on the video capture and distinguishing in the close-out package.

In another exemplary embodiment, a system adapted for providing a close-out package of a site subsequent to maintenance or installation work includes a network interface and a processor communicatively coupled to one another; and memory storing instructions that, when executed, cause the processor to, subsequent to the maintenance or installation work, obtain video capture of components associated with the work; subsequent to the video capture, process the video capture to obtain data for the close-out package, wherein the processing comprises identifying the site components associated with the work; and create a close-out package based on the processed video capture, wherein the close-out package provides verification of the maintenance or installation work and outlines that the maintenance or installation work was performed in a manner consistent with an operator or owner's guidelines.

The close-out package can include, without limitation, drawings, site component settings, test results, equipment lists, pictures, commissioning data, GPS data, equipment data, serial numbers, cabling, etc.

3D Modeling Systems and Methods

The 3D modeling method utilizes various techniques to obtain data, to create 3D models, and to detect changes in configurations and surroundings. The 3D models can be created at two or more different points in time, and with the different 3D models, a comparison can be made to detect the changes. Advantageously, the 3D modeling systems and methods allow operators and installers to manage the sites efficiently without repeated physical site surveys.

A modeling method includes obtaining first data regarding the site from a first inspection performed using one or more data acquisition techniques and obtaining second data regarding the site from a second inspection performed using the one or more data acquisition techniques, wherein the second inspection is performed at a different time than the first inspection, and wherein the first data and the second data each include one or more location identifiers associated therewith. Systems can then process the first data to define a first model of the site using the associated one or more location identifiers and process the second data to define a second model of the site using the associated one or more location identifiers. It is then possible to compare the first model with the second model to identify the changes in or at the site and perform one or more actions based on the identified changes.

The one or more actions can include any remedial or corrective actions including maintenance, landscaping, mechanical repair, and the like. The identified changes can be associated with site components installed in an area of the site, a building, etc. and wherein the one or more actions include any of maintenance, licensing with operators, and removal. The identified changes can be associated with the physical surroundings of the site, and wherein the one or more actions comprise maintenance to correct the identified changes. The identified changes can include any of degradation of gravel roads, trees obstructing a structure or component, physical hazards at the site, and mechanical issues with the installed components/equipment.

The first data and the second data can be obtained remotely, without being at the site. The first model and the second model each can include a three-dimensional model of the site, displayed in a Graphical User Interface (GUI). The one or more data acquisition techniques can include using an Unmanned Aerial Vehicle (UAV) or various camera systems to capture the first data and the second data. The one or more data acquisition techniques can include using a fixed or portable camera to capture the first data and the second data. The one or more location identifiers can include at least two location identifiers comprising Global Positioning Satellite (GPS) and Global Navigation Satellite System (GLONASS) data. The second model can be created using the first model as a template for expected objects at the site.

In another exemplary embodiment, a modeling system adapted for detecting changes in or at a site includes a network interface and a processor communicatively coupled to one another; and memory storing instructions that, when executed, cause the processor to obtain first data regarding the site from a first inspection performed using one or more data acquisition techniques and obtain second data regarding the site from a second inspection performed using the one or more data acquisition techniques, wherein the second inspection is performed at a different time than the first inspection, and wherein the first data and the second data each include one or more location identifiers associated therewith; process the first data to define a first model of the site using the associated one or more location identifiers and process the second data to define a second model of the site using the associated one or more location identifiers; compare the first model with the second model to identify the changes in or at the site; and cause performance of one or more actions based on the identified changes.

3D Modeling Data Capture Systems and Methods

Figure 13:
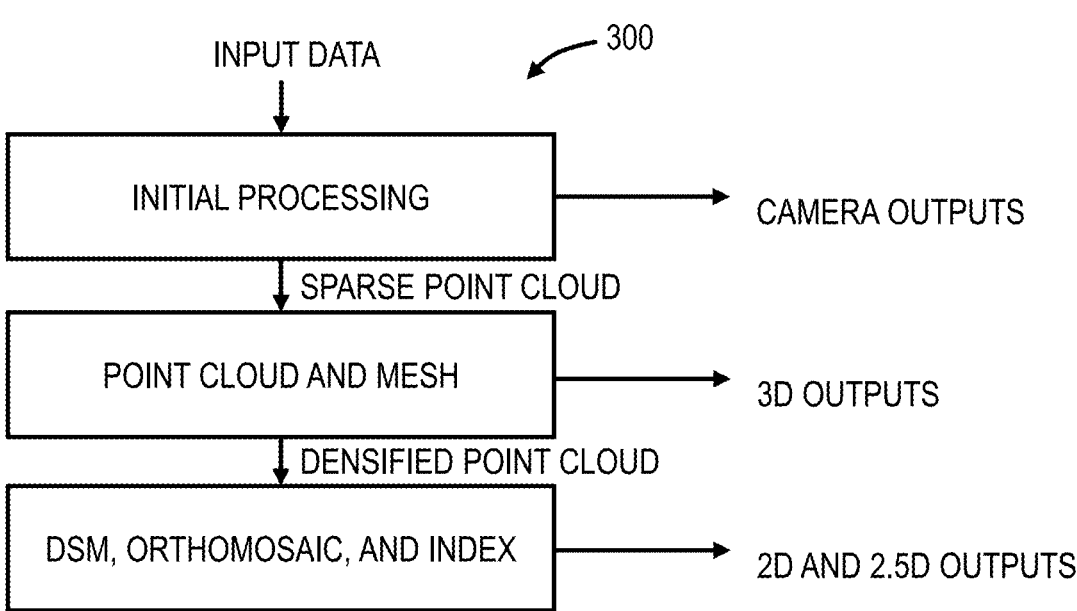
FIG. 13 is a flow diagram of a 3D model creation process.

Again, various exemplary embodiments herein describe applications and uses of 3D models of sites. Further, it has been described using a UAV and other camera systems to obtain data capture for creating the 3D model. The data capture systems and methods described herein provide various techniques and criteria for properly capturing images or video using the UAV. Referring to FIG. 13, in an exemplary embodiment, a flow diagram illustrates a 3D model creation process 300. The 3D model creation process 300 is implemented on a server or the like. The 3D model creation process 300 includes receiving input data, i.e., pictures and/or video. The data capture systems and methods describe various techniques for obtaining the pictures and/or video using a UAV or a fixed or movable camera at a site or in a building. In an exemplary embodiment, the pictures can be at least 10 megapixels, and the video can be at least 4 k high definition video.

The 3D model creation process 300 performs initial processing on the input data. An output of the initial processing includes a sparse point cloud, a quality report, and an output file can be camera outputs. The sparse point cloud is processed into a point cloud and mesh providing a densified point cloud and 3D outputs. The 3D model is an output of the step. Other models can be developed by further processing the densified point cloud to provide a Digital Surface Model (DSM), an orthomosaic, tiles, contour lines, etc.

The data capture systems and methods include capturing thousands of images or video which can be used to provide images. The data capture can include a plurality of photographs each with at least 10 megapixels and wherein the plurality of constraints can include each photograph having at least 75% overlap with another photograph. Specifically, the significant overlap allows for ease in processing to create the 3D model. The data capture can include a video with at least 4 k high definition and wherein the plurality of constraints can include capturing a screen from the video as a photograph having at least 75% overlap with another photograph captured from the video.

Multiple Camera Apparatus and Process

Figure 14:
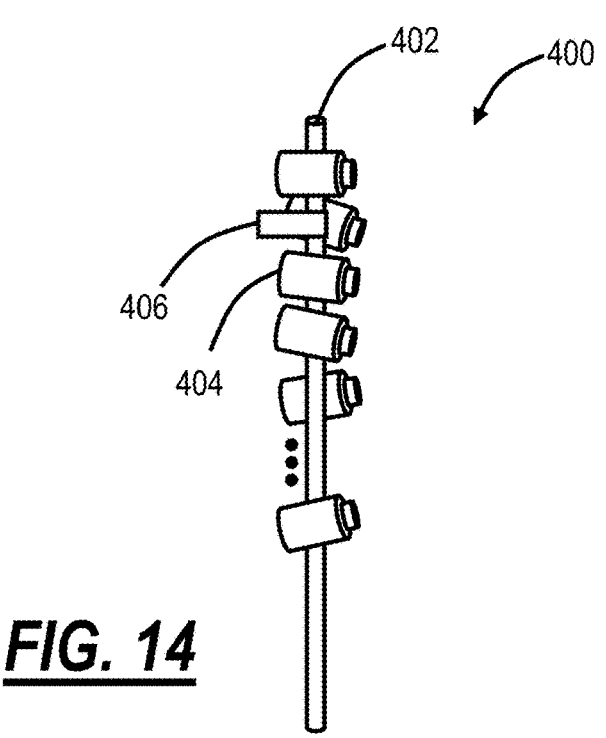
FIGS. 14 and 15 are diagrams of a multiple camera apparatus and use of the multiple camera apparatus in a shelter or cabinet or the interior of a building.
Figure 15:
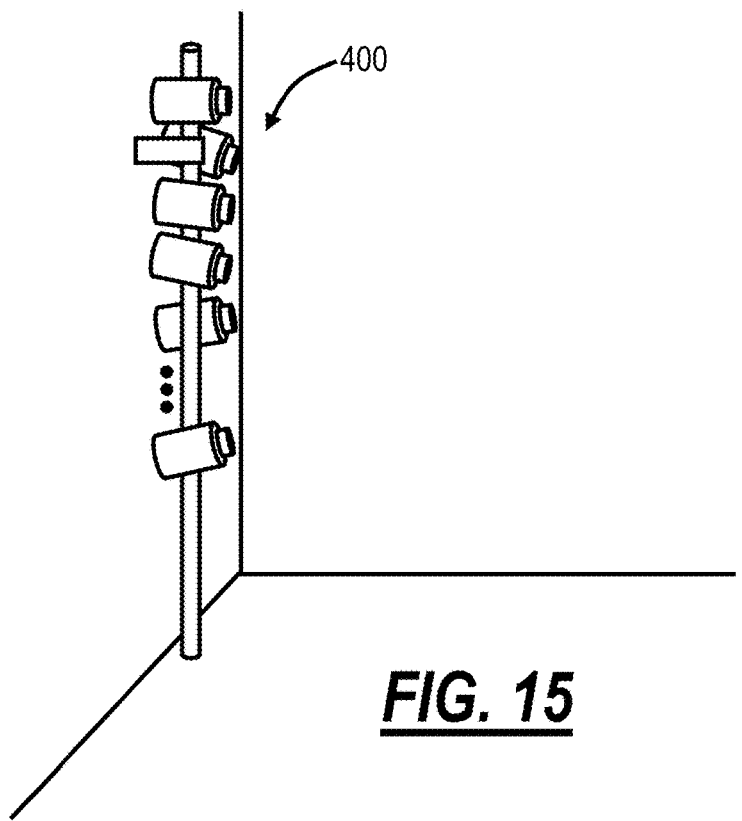

Referring to FIGS. 14 and 15, in an exemplary embodiment, diagrams illustrate a multiple camera apparatus 400 and use of the multiple camera apparatus 400 in the interior 200 of the building 202. As previously described herein, the camera 230 can be used in the interior 200 for obtaining photos for 3D modeling and for virtual site inspections. The multiple camera apparatus 400 is an improvement to the camera 230, enabling multiple photos to be taken simultaneously of different views, angles, zoom, etc. In an exemplary embodiment, the multiple camera apparatus 400 can be operated by a technician at the building 202 to quickly, efficiently, and properly obtain photos for a 3D model of the interior 200. In another exemplary embodiment, the multiple camera apparatus 400 can be mounted in the interior 200 and remotely controlled by an operator.

The multiple camera apparatus 400 includes a post 402 with a plurality of cameras 404 disposed or attached to the post 402. The plurality of cameras 404 can be interconnected to one another and to a control unit 406 on the post. The control unit 406 can include user controls to cause the cameras 404 to each take a photo and memory for storing the photos from the cameras 404. The control unit 406 can further include communication mechanisms to provide the captured photos to a system for 3D modeling (either via a wired and/or wireless connection). In an exemplary embodiment, the post 402 can be about 6' and the cameras 404 can be positioned to enable data capture from the floor to the ceiling of the interior 200.

The multiple camera apparatus 400 can include other physical embodiments besides the post 402. For example, the multiple camera apparatus 400 can include a box with the multiple cameras 404 disposed therein. In another example, the multiple camera apparatus 400 can include a handheld device which includes the multiple cameras 404.

The objective of the multiple camera apparatus 400 is to enable a technician (either on-site or remote) to quickly capture photos (through the use of the multiple cameras 404) for a 3D model and to properly capture the photos (through the multiple cameras 404 have different zooms, angles, etc.). That is, the multiple camera apparatus 400 ensures the photo capture is sufficient to accurately develop the 3D model, avoiding potentially revisiting the building 202.

In an exemplary embodiment, a data capture method includes, in the interior 200, using the multiple camera apparatus 400. The method includes obtaining or providing the multiple camera apparatus 400 at the interior 200 of the building 202 and positioning the multiple camera apparatus 400 therein. The method further includes causing the plurality of cameras 404 to take photos based on the positioning and repositioning the multiple camera apparatus 400 at a different location in the interior 200 of the building 202 to take additional photos. Finally, the photos taken by the cameras 404 are provided to a 3D modeling system to develop a 3D model of the interior 200 of the building 202, such as for a virtual site inspection or prior to an installation.

The repositioning step can include moving the multiple camera apparatus to each corner of the interior of the building. The repositioning step can include moving the multiple camera apparatus to each row of equipment in the interior of the building. The multiple camera apparatus can include a pole with the plurality of cameras disposed thereon, each of the plurality of cameras configured for a different view. Each of the plurality of cameras can be configured on the multiple camera apparatus for a different view, zoom, and/or angle. The method can include analyzing the photos subsequent to the repositioning; and determining whether the photos are suitable for the 3D model, and responsive to the photos not being suitable for the 3D model, instructing a user to retake the photos which are not suitable. The method can include combing the photos of the interior of the building with other photos of a site, to form a complete 3D model of the site. The method can include performing a virtual site inspection of the site using the 3D model. The repositioning step can be based on a review of the photos taken.

In a further exemplary embodiment, a method for obtaining data capture at a site for developing a 3D model thereof includes obtaining or providing the multiple camera apparatus comprising a plurality of cameras to an interior of a building and positioning the multiple camera apparatus therein; causing the plurality of cameras to simultaneously take photos based on the positioning; repositioning the multiple camera apparatus at a different location in the building to take additional photos; obtaining other photos of the site; and providing the photos taken by the multiple camera apparatus and the other photos to a 3D modeling system to develop a 3D model of the site, for a virtual site inspection thereof.

Site Verification Using 3D Modeling

As described herein, an intermediate step in the creation of a 3D model includes a point cloud, e.g., a sparse or dense point cloud. A point cloud is a set of data points in some coordinate system, e.g., in a three-dimensional coordinate system, these points are usually defined by X, Y, and Z coordinates, and can be used to represent the external surface of an object. Here, the object can be anything associated with the site, e.g., an external area of the site, buildings, etc. As part of the 3D model creation process, a large number of points on an object's surface are determined, and the output is a point cloud in a data file. The point cloud represents the set of points that the device has measured.

Various descriptions are presented herein for site inspections, close-out packages, etc. In a similar manner, there is a need to continually monitor the state of the site. The site verification can utilize point clouds to compare "before" and "after" data capture to detect differences.

One approach to verifying the site is a site inspection, including the various approaches to site inspections described herein, including the use of 3D models for remote site inspections. In various embodiments, a quick and automated mechanism to quickly detect concerns (i.e., compliance issues, defects, etc.) using point clouds is provided. Specifically, steps can include creating an initial point cloud for a site or obtaining the initial point cloud from a database. The initial point cloud can represent a known good condition, i.e., with no compliance issues, defects, etc. For example, the initial point cloud could be developed as part of the close-out package, etc. The initial point cloud can be created using the various data acquisition techniques described herein. Also, a database can be used to store the initial point cloud.

The initial point cloud is loaded in a device. The point cloud data files can be stored in the memory in a processing device. In an exemplary embodiment, multiple point cloud data files can be stored, allowing the cameras to be deployed to perform the steps at a plurality of sites. The device (i.e., UAV or camera systems) can be used to develop a second point cloud based on current conditions at the site. Again, a UAV and various camera systems can use the techniques described herein relative to data acquisition to develop the second point cloud. Note, it is preferable to use a similar data acquisition for both the initial point cloud and the second point cloud, e.g., similar takeoff locations/orientations, similar paths, etc. This ensures similarity in the data capture. In an exemplary embodiment, the initial point cloud is loaded to the UAV or camera system along with instructions on how to perform the data acquisition for the second point cloud. The second point cloud is developed at a current time, i.e., when it is desired to verify aspects associated with the site.

Variations are detected between the initial point cloud and the second point cloud. The variations could be detected, in an external server, in a database, etc. The objective here is the initial point cloud, and the second point cloud provides a quick and efficient comparison to detect differences, i.e., variations. Note, variations can be simply detected based on raw data differences between the point clouds. In an exemplary embodiment, the variations are detected, and, if detected, additional processing is performed by a server to actually determine the differences based on creating a 3D model of each of the point clouds. Finally, the second point cloud can be stored in the database for future processing. An operator can be notified via any technique of any determined variations or differences for remedial action based thereon (addressing non-compliance, performing maintenance to fix defects, etc.).

Site Inspection Via Photo Stitching

Photo stitching or linking is a technique where multiple photos of either overlapping fields of view or adjacent fields of view are linked together to produce a virtual view or segmented panorama of an area. A common example of this approach is the so-called street view offered by online map providers. In various exemplary embodiments, the systems and methods enable a remote user to perform a site inspection using a User Interface (UI) with photo stitching/linking to view the site. The various activities can include any of the activities described herein.

Further, the photos can also be obtained using any of the techniques described herein. Of note, the photos required for a photo stitched UI are significantly less than those required by the 3D model. However, the photo stitched UI can be based on the photos captured for the 3D model, e.g., a subset of the photos. Alternatively, the photo capture for the photo stitched UI can be captured separately. Variously, the photos for the UI are captured, and a linkage is provided between photos. The linkage allows a user to navigate between photos to view up, down, left, or right, i.e., to navigate the site via the UI. The linkage can be noted in a photo database with some adjacency indicator. The linkage can be manually entered via a user reviewing the photos or automatically based on location tags associated with the photos.

Figure 16:
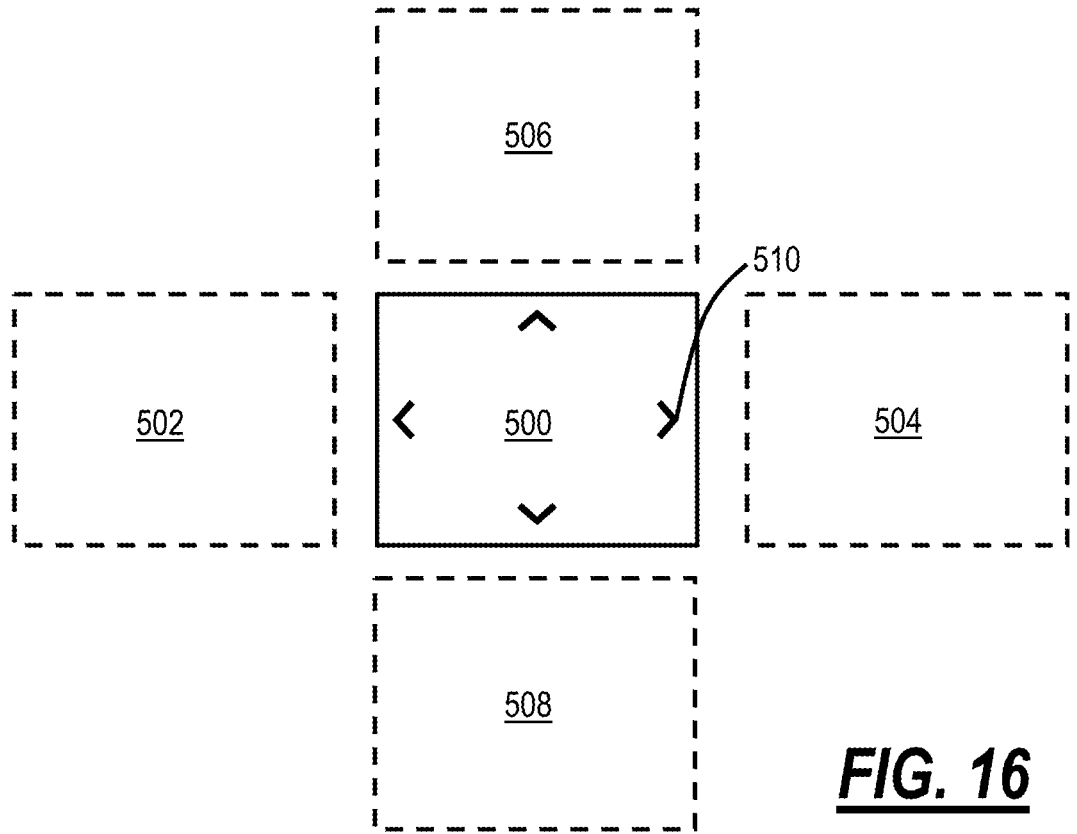
FIG. 16 is a diagram of a photo stitching User Interface (UI) for site inspections, surveys, etc. remotely.

Referring to FIG. 16, in an exemplary embodiment, a diagram illustrates a photo stitching UI 500 for site inspections remotely. The UI 500 is viewed by a computer accessing a database of a plurality of photos with the linkage between each other based on adjacency. The photos are of the site and can include exterior areas, associated site components, as well as interior photos of buildings. The UI 500 displays a photo of the site and the user can navigate to the left to a photo 502, to the right to a photo 504, up to a photo 506, or down to a photo 508. The navigation between the photos 502, 504, 506, 508 is based on the links between the photos. In an exemplary embodiment, a navigation icon 510 is shown in the UI 500 from which the user can navigate the UI 500. Also, the navigation can include opening and closing a door to a building for gaining access to interior photos.

In an exemplary embodiment, the UI 500 can include one of the photos 502, 504, 506, 508 at a time with the navigation moving to a next photo. In another exemplary embodiment, the navigation can scroll through the photos 502, 504, 506, 508 seamlessly. In either approach, the UI 500 allows virtual movement around the site remotely. The photos 502, 504, 506, 508 can each be a high-resolution photo, e.g., 8 megapixels or more. From the photos 502, 504, 506, 508, the user can read labels on equipment, check fiber cable installation, check equipment location and installation, etc. Also, the user can virtually ascend to an aerial view of the site, i.e., based on photos taken from the UAV. An engineer can use the UI 500 to perform site expansion, e.g., where to install new equipment. Further, once the new equipment is installed, the associated photos can be updated to reflect the new equipment. It is not necessary to update all photos, but rather only the photos of new equipment locations.

The photos 502, 504, 506, 508 can be obtained using the data capture techniques described herein. The camera used for capturing the photos can be a 180, 270, or 360-degree camera. These cameras typically include multiple sensors allowing a single photo capture to capture a large view with a wide lens, fish eye lens, etc. The cameras can be mounted on a UAV for capturing aerial views, the multiple camera apparatus 400, etc. Also, the cameras can be the camera 230 in the interior 200.
Augmented Reality The augmented reality systems and methods allow a user to experience 3D digital objects through a digital camera such as on a mobile device, tablet, laptop, etc. The 3D digital objects can be created via photogrammetry or created as a 3D model. The user can project the 3D digital objects onto in a virtual environment including real-time in a view on a phone, tablet, etc. as well as in existing virtual environments.

For example, the augmented reality systems and methods can be used in fiber cable installations such as in a site area and in a building. The augmented reality systems and methods can assist engineers, planners, installers, operators, etc. to visualize new equipment on site, to determine where installation should occur, to determine cable lengths, to perform engineering, to show the operators options, etc. The augmented reality systems and methods can include visualizing placements in buildings. The augmented reality systems and methods can be used to visualize outdoor equipment.

Advantageously, the augmented reality systems and methods can be used to show stakeholders (site operators, service providers, building owners, the general public, etc.) the view prior to construction or installation. Since the view is easily manipulable, the stakeholders can use the augmented reality systems and methods to agree on project scope in advance, with very little cost for changes as there are all performed in the virtual environment. This can lead to easier project approval and general satisfaction amongst the stakeholders.
Fiber Optic Construction To provide high speed connectivity to infrastructure, homes, businesses, etc. fiber optic networks are being constructed globally. These networks can be constructed in a variety of ways including underground fiber, aerial fiber, and a combination thereof. At an average installation cost of $1,000 to $1,250 per residential household passed or $60,000 to $80,000 per mile, it is crucial for such installation projects to be thoughtfully and optimally planned out.

Fiber optic networks can be constructed through the placement of underground and aerial fiber. Underground installations include the process of trenching to create great lengths of underground space in which to place fiber optic cables in a conduit system. In order to bury these conduit systems, various techniques including plowing, trenching, jacking and boring, multi-directional boring, and directional boring can be used. Alternatively, installing aerial fiber includes fiber optic cables being placed on top of existing or new utility or telephone poles.

Generally, fiber construction can take an average of 6 to 10 months for a network to become operational, not including the time allowed for planning. However, the timeline for a new fiber optic network to be constructed varies greatly depending on the number of miles to be constructed, the number of homes or premises targeted for connection to the network, and the general deployment of the network.

Figure 17:
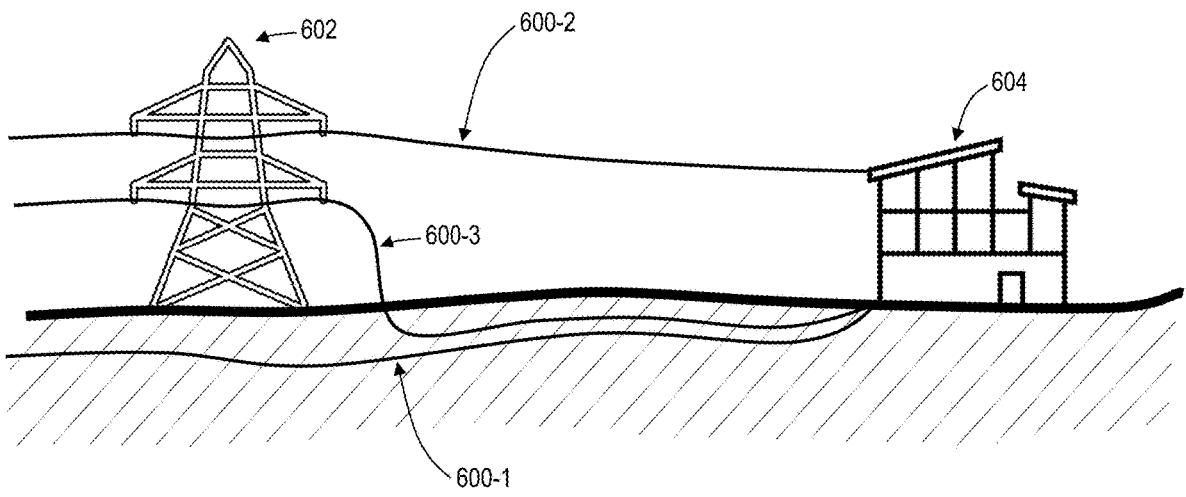
FIG. 17 is a diagram showing various configurations of fiber networks.

FIG. 17 is a diagram showing the various configurations of fiber networks. Again, the various configurations include underground fiber, aerial fiber, and a combination thereof. The resulting cable (fiber cable) configurations of these methods are shown as cables 600-1, 600-2, and 600-3. The cable 600-1 represents an underground cable installation, i.e., a fiber cable installed by plowing, trenching, jacking and boring, multi-directional boring, and/or directional boring. In addition to traditional trenching techniques, micro-trenching techniques are also contemplated and described further herein. The cable 600-2 represents an aerial cable installation, i.e., a fiber cable placed on top of utility poles or telephone poles, hereinafter referred to as poles 602. Finally, the cable 600-3 represents a cable installed utilizing a combination of underground and aerial installation. In the diagram, the cable 600-3 is shown to be installed aerially and then transitioning to an underground location before terminating at the structure 604. It will be appreciated that other embodiments include any combination of aerial and underground installation, and the examples shown in FIG. 17 are non-limiting. Further, the structure 604 can be any of a residential home, a business, a network related structure such as a telecommunications provider's central office, and other buildings of the like which require connection to the fiber network.

As stated, fiber installation can include the use of directional boring as a method for burying conduit/cables. Typically, the directional boring method is a three step process. First, a pilot hole is drilled from one surface point to the other. The drilling takes place along the predetermined directional path. After drilling, the bore is enlarged to a diameter that allows for the installation of the required conduit/cable. Finally, the cable is pulled into the hole.

Such cable installation projects can further include planning for one or more intermediate handholes/manholes at splice locations and facility locations. These handholes typically include 65 to 150 feet of slack cable to provide the ability to service splice locations and provide buffers. It is important to optimally plan out the locations of such handholes as improper planning of splice locations can greatly increase the amount of cable needed, which can greatly increase the cost of the project.

Additionally, micro-trenching is becoming a popular alternative to traditional trenching techniques. Micro-trenching is a new fiber network construction technique which includes laying protective conduit that houses the fiber strands below and at the side of a roadway. These procedures require much less digging and much less disruption than other network building methods. Methods include cutting a 1.5 to 2-inch wide slot close to where the curb meets the road surface. This slot is typically 12 to 16 inches deep so the conduit that houses the fiber strands won't be disturbed. This technique is also used where cables must traverse across a roadway or paved area such as a parking lot.

Figure 18:
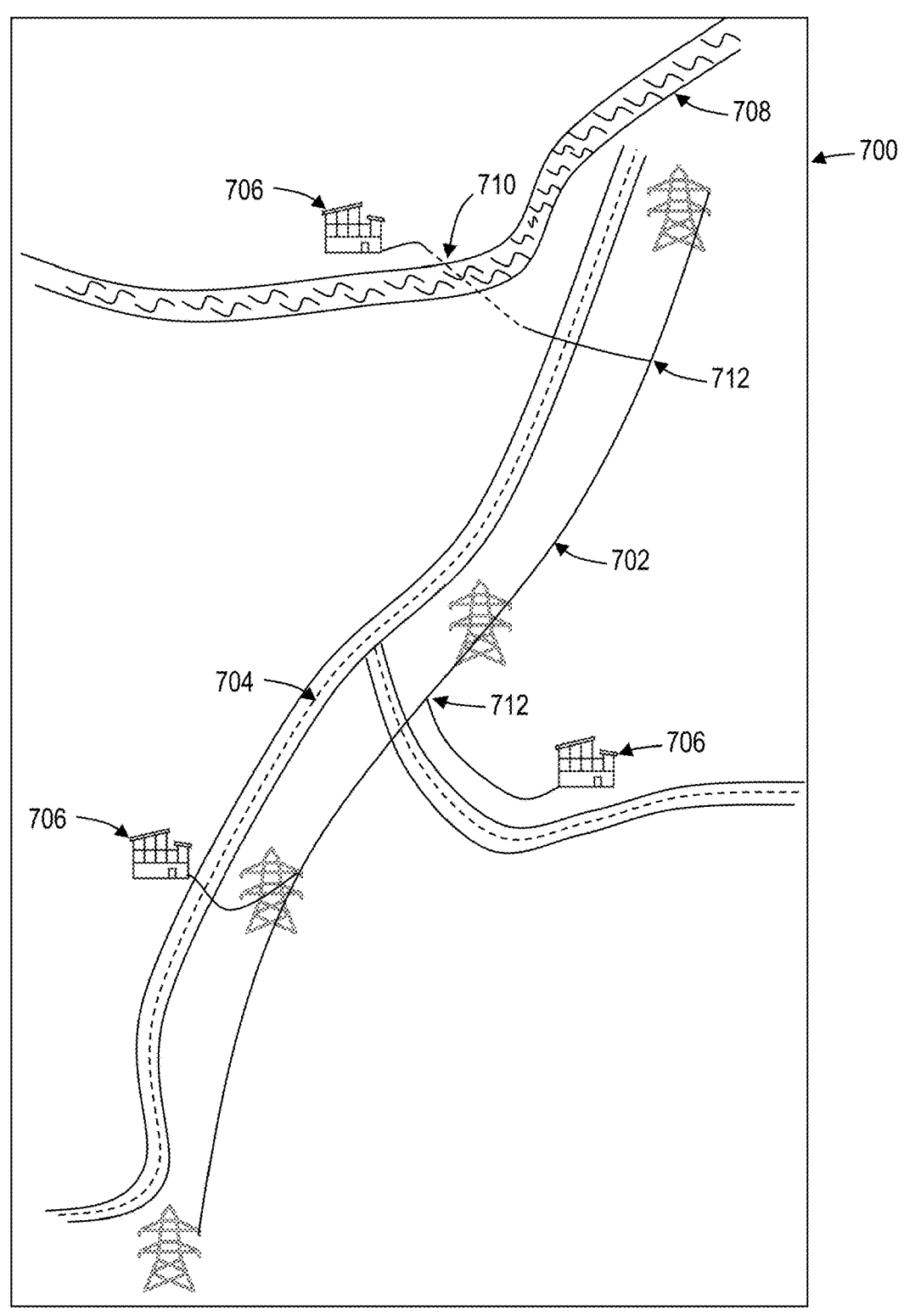
FIG. 18 is a diagram of an installation area.

FIG. 18 is a diagram of an installation area. The example installation area 700 shows a fiber network including cables 702 traversing the installation area 700. In the example shown in FIG. 18, the installation area 700 shows a highway system including a plurality of roads 704 interconnecting a plurality of structures 706. The example shows the cables 702 routed between the plurality of structures 706 and along the roads 704. Again, a fiber network can be constructed utilizing a combination of different methods. These methods include plowing, trenching, jacking and boring, multi-directional boring, directional boring, micro-trenching, and aerial installation. It is important to utilize the various methods across the fiber network as necessary to reduce the overall length of cable required. For example, in FIG. 18, a river 708 can be traversed by utilizing directional boring for installing the cables 702 underground. This is highlighted by the dashed cable section 710. Additionally, it is crucial to optimally plan out the positions of various splice locations 712. Again, these splice locations 712 typically include 65 to 150 feet of slack cable to provide the ability to service the fiber network and branch the network into various directions.

In various embodiments, the installation area 700 can include the interior of the various structures 706. It will be appreciated that the example installation area shown in FIG. 18 can be of any size ranging from a single structure to an entire highway system including a plurality of structures and various geographical features such as the river 708. Thus, the example shown shall be contemplated as non-limiting.

Fiber Optic Construction with Remote Visualization

Typically, for underground installation of cables, the cables are placed adjacent to roadways, such as interstate highways, city streets, etc. Such installations can span hundreds of miles and include locations where bridges, railroads, and tunnels must be traversed. This further emphasizes the importance of thoughtful planning before beginning an installation of such scale. Various embodiments described herein include utilizing the 3D modeling and UI capabilities in the cable installation process. For example, the various visualization technologies described herein, i.e., the 3D modeling, 360 degree views, augmented reality, and photo stitching (remote visualizations) can all be used to determine the placement and routing of cables to optimize and reduce the cost of the installation project. These technologies can further be used to inspect such installations and provide close-out packages for verifying proper installation.

By utilizing a UAV, large areas can be mapped/modeled, allowing installers to create a detailed plan which acknowledges the entire installation including interiors of various structures. This can greatly reduce the amount of wasted material by allowing installers to plan the exact route which the cables will follow, whether underground or aerial. In addition to large scale visualizations, i.e., visualization of a highway systems, a neighborhood, intersections, business parks, etc., more detailed visualizations are also contemplated. This includes utilizing the described visualization techniques to model more detailed portions of an installation such as the termination and connection of cables at a home, business, network related structure, etc. This can include creating models of buildings or groups of buildings which cables must traverse in order to optimize its route and creating interactive models of building interiors for cable terminations and connections. Such an optimal route can be a route in which the least amount of cable and trenching distance is necessary for completing the fiber network.

In addition to large scale visualizations, for planning micro-trenching operations, methods can include providing visualizations of smaller areas such as intersections, parking lots, streets, etc.

Further, the remote visualizations can be utilized to plan exactly where to perform the various fiber network construction activities. These activities again include plowing, trenching, jacking and boring, multi-directional boring, directional boring, and micro-trenching. That is, the remote visualizations can be used to plan/plot exactly where trenching, micro-trenching, and/or boring will be performed. Further, the remote visualizations can be utilized to plan installation procedures for installing the fiber network to various structures, these structures can again be any of a residential home, a business, a network related structure such as a telecommunications provider's central office, and other buildings of the like which require connection to the fiber network.

Again, directional boring can be used where trenching and excavation is not feasible. By utilizing the remote visualization techniques described herein, the optimal location for utilizing such boring methods can be determined, i.e., locations best suited for directional boring. Such locations can include any location where trenching or overhead installation cannot be done. This includes areas where cables need to be installed across bodies of water (i.e., rivers and the like), roads, underneath structures or infrastructure, etc. For example, in a large scale fiber network installation, the remote visualization techniques can be utilized to pinpoint exactly where along the cable path directional boring should be used. Thus, combinations of different construction methods are contemplated, where the remote visualizations help determine which method is best suited for specific locations along the fiber network path. Therefore, by using the visualizations, installers can determine where along the fiber network path using directional boring can reduce the overall length of the path. The length of the path (length of cables in the fiber network) is contemplated as a total length of fiber cable needed to construct the fiber network. By using directional boring over trenching in specific areas, the path can be greatly reduced.

In an exemplary embodiment, a combination of the visualization techniques can be used for planning cable installation. This can include utilizing the various camera systems, i.e., UAVs and other camera systems described herein to capture photos of an installation area and further create models and interactive UIs of these areas. It will be appreciated that an installation area can be of any scale including entire highway systems, neighborhoods, intersections, splice locations, individual buildings, and such. Again, these techniques can be used to plan underground cable installations, aerial cable installations, and any combination thereof.

In an embodiment, camera systems can be used to provide a 360 degree view of a site before and after an installation. This includes providing a 360 degree view of a site to be trenched (i.e., trenching or micro-trenching) for planning the location of the trench.

A close-out package of the site (installation area) can be performed after the maintenance or installation work. The close-out package includes, subsequent to the maintenance or installation work, performing a virtual site inspection which includes obtaining photos and video of the site. Subsequent to the photo and video capture, processing the photos and video capture to obtain data for the close-out package, wherein the processing comprises identifying components and locations associated with the work. Steps can further include creating a close-out package based on the processed photo and video capture, wherein the close-out package provides verification of the maintenance or installation work and outlines that the maintenance or installation work was performed in a manner consistent with the identified optimal plan.

FIG. 19 is a flowchart of a process 800 for installing a fiber network. The process 800 includes causing one or more cameras to capture a plurality of photographs of an installation area (step 802); obtaining the plurality of photographs and causing processing of the plurality of photographs to provide one or more remote visualizations of the installation area (step 804); utilizing the one or more remote visualizations to determine an optimal route for trenching fiber cables (step 806); and installing the fiber network based on the determined optimal route (step 808).

The process 800 can further include wherein the optimal route includes a combination of underground and overhead fiber cables. The installation area can include any of a highway system, a neighborhood, an intersection, a business park, and one or more buildings. The determining can include determining one or more locations for installing splice locations in the fiber network. The processing can include processing the plurality of photographs to define a three dimensional (3D) model of the installation area based on one or more location identifiers and one or more objects of interest in the plurality of photographs. The steps can include causing the one or more cameras to capture a 360 degree view of the installation area. Causing the one or more cameras to capture a plurality of photographs can include causing an Unmanned Aerial Vehicle (UAV) to fly a flight path over the installation area and capture the plurality of photographs. The plurality of photographs can be obtained from a combination of an Unmanned Aerial Vehicle (UAV) and one or more camera systems. Determining an optimal route can include, based on the one or more remote visualizations, determining a route which includes a shortest trenching distance for installing the fiber network. Causing the one or more cameras to capture a plurality of photographs can be performed remotely. The steps can further include, after the installing, performing a virtual site inspection of the fiber network. Performing a virtual site inspection of the fiber network can include causing the one or more cameras to capture a plurality of photographs of the installation area after the installation is completed. The steps can include providing a close-out package, wherein the close-out package provides verification of the fiber network installation.

FIG. 20 is a flowchart of a process 810 for installing fiber networks via micro-trenching. Process 810 includes causing one or more cameras to capture a plurality of photographs of an installation area (step 812); obtaining the plurality of photographs and causing processing of the plurality of photographs to provide one or more remote visualizations of the installation area (step 814); utilizing the one or more remote visualizations to determine an optimal route for micro-trenching fiber cables (step 816); and performing the micro-trenching based on the determined optimal route (step 818).

The process 810 can further include wherein the installation area includes any of a parking lot, an intersection, and a street. The processing can include processing the plurality of photographs to define a three dimensional (3D) model of the installation area based on one or more location identifiers and one or more objects of interest in the plurality of photographs. The steps can include causing the one or more cameras to capture a 360 degree view of the installation area. Causing the one or more cameras to capture a plurality of photographs can include causing an Unmanned Aerial Vehicle (UAV) to fly a flight path over the installation area and capture the plurality of photographs. The plurality of photographs can be obtained from a combination of an Unmanned Aerial Vehicle (UAV) and one or more camera systems. Determining an optimal route can include, based on the one or more remote visualizations, determining a route which includes a shortest distance for installing the fiber network. Causing the one or more cameras to capture a plurality of photographs can be performed remotely. The steps can further include, after the installing, performing a virtual site inspection of the fiber network. Performing a virtual site inspection of the fiber network can include causing the one or more cameras to capture a plurality of photographs of the installation area after the installation is completed. The steps can further include providing a close-out package, wherein the close-out package provides verification of the fiber network installation.

FIG. 21 is a flowchart of a process 820 for utilizing directional boring in fiber network installations. The process 820 includes causing one or more cameras to capture a plurality of photographs of an installation area (step 822); obtaining the plurality of photographs and causing processing of the plurality of photographs to provide one or more remote visualizations of the installation area (step 824); utilizing the one or more remote visualizations for determining one or more locations in the installation area best suited for directional boring (step 826); and installing portions of a fiber network via directional boring in the one or more locations (step 828).

Determining one or more locations in the installation area best suited for directional boring can include, based on the one or more remote visualizations, determining one or more locations where directional boring reduces an overall length of the fiber network. The installation area can include any of a highway system, a neighborhood, an intersection, a business park, and one or more buildings. The processing can include processing the plurality of photographs to define a three dimensional (3D) model of the installation area based on one or more location identifiers and one or more objects of interest in the plurality of photographs. The steps can include causing the one or more cameras to capture a 360 degree view of one or more locations in the installation area. Causing the one or more cameras to capture a plurality of photographs can include causing an Unmanned Aerial Vehicle (UAV) to fly a flight path over the installation area and capture the plurality of photographs. The plurality of photographs can be obtained from a combination of an Unmanned Aerial Vehicle (UAV) and one or more camera systems. Causing the one or more cameras to capture a plurality of photographs can be performed remotely. The steps can further include, after the installing, performing a virtual site inspection of the fiber network and the one or more locations. Performing a virtual site inspection of the fiber network can include causing the one or more cameras to capture a plurality of photographs of the installation area and the one or more locations after the installation is completed. The steps can further include providing a close-out package, wherein the close-out package provides verification of the fiber network installation.

FIG. 22 is a flowchart of a process 830 for installing overhead fiber networks. The process 830 includes causing one or more cameras to capture a plurality of photographs of an installation area (step 832); obtaining the plurality of photographs and causing processing of the plurality of photographs to provide one or more remote visualizations of the installation area (step 834); utilizing the one or more remote visualizations for determining optimal route for overhead fiber cables (step 836); and installing the fiber network based on the determined optimal route (step 838).

The optimal route can include a combination of overhead and underground fiber cables. Determining an optimal route can include, based on the one or more remote visualizations, determining a route which includes a shortest overhead distance for installing the fiber network. The installation area can include any of a highway system, a neighborhood, an intersection, a business park, and one or more buildings. The processing can include processing the plurality of photographs to define a three dimensional (3D) model of the installation area based on one or more location identifiers and one or more objects of interest in the plurality of photographs. The steps can include causing the one or more cameras to capture a 360 degree view of the installation area. Causing the one or more cameras to capture a plurality of photographs includes causing an Unmanned Aerial Vehicle (UAV) to fly a flight path over the installation area and capture the plurality of photographs. The plurality of photographs can be obtained from a combination of an Unmanned Aerial Vehicle (UAV) and one or more camera systems. Causing the one or more cameras to capture a plurality of photographs can be performed remotely. The steps can include, after the installing, performing a virtual site inspection of the fiber network. Performing a virtual site inspection of the fiber network can include causing the one or more cameras to capture a plurality of photographs of the installation area after the installation is completed. The steps can include providing a close-out package, wherein the close-out package provides verification of the fiber network installation.

FIG. 23 is a flowchart of a process 840 for installing a fiber network to a structure. The process 840 includes causing one or more cameras to capture a plurality of photographs of an installation area (step 842); obtaining the plurality of photographs and causing processing of the plurality of photographs to provide one or more remote visualizations of the installation area (step 844); utilizing the one or more remote visualizations for determining an installation procedure for installing the fiber network to the structure (step 846); and installing the fiber network based on the determined installation procedure (step 848).

The installation area can include any of an exterior and an interior of the structure. The installation area can include any of an exterior and an interior of a plurality of structures, and the determining includes determining an installation procedure for installing the fiber network to the plurality of structures. The processing can include processing the plurality of photographs to define a three dimensional (3D) model of the installation area based on one or more location identifiers and one or more objects of interest in the plurality of photographs. The steps can include causing the one or more cameras to capture a 360 degree view of the installation area. Causing the one or more cameras to capture a plurality of photographs can include causing an Unmanned Aerial Vehicle (UAV) to fly a flight path over the installation area and capture the plurality of photographs. Causing the one or more cameras to capture a plurality of photographs includes causing one or more camera systems to capture a plurality of photographs of an interior of the structure. The plurality of photographs can be obtained from a combination of an Unmanned Aerial Vehicle (UAV) and one or more camera systems. Causing the one or more cameras to capture a plurality of photographs can be performed remotely. The steps can include, after the installing, performing a virtual site inspection of the fiber network. Performing a virtual site inspection of the fiber network can include causing the one or more cameras to capture a plurality of photographs of the installation area after the installation is completed. The steps can include providing a close-out package, wherein the close-out package provides verification of the fiber network installation.

CONCLUSION

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of installing a fiber network, the method comprising steps of:

causing one or more cameras to capture a plurality of photographs of an installation area, the installation area including interiors of structures and surrounding areas, each of the plurality of photographs including at least two distinct location identifiers indicative of a position of the one or more cameras when each of the plurality of photographs were taken;

obtaining the plurality of photographs and causing processing of the plurality of photographs to provide one or more remote visualizations of the installation area wherein the processing comprises photogrammetry-based construction of a three-dimensional (3D) model from the plurality of photographs including overlapping fields of view;

utilizing the one or more remote visualizations to determine an optimal route for trenching fiber cables, including determining that the optimal route reduces an overall trenching distance across at least one of a body of water, roadway, or structure, and wherein the optimal route includes a combination of underground and overhead fiber cables; and installing the fiber network based on the determined optimal route.

2. The method of claim 1, wherein the installation area includes any of a highway system, a neighborhood, an intersection, a business park, and one or more buildings.

3. The method of claim 1, wherein the determining includes determining one or more locations for installing splice locations in the fiber network.

4. The method of claim 1, wherein the processing includes processing the plurality of photographs to define a three dimensional (3D) model of the installation area based on one or more location identifiers and one or more objects of interest in the plurality of photographs, wherein the 3D model of the installation area includes interiors and exteriors of structures.

5. The method of claim 1, wherein the steps comprise causing the one or more cameras to capture a 360 degree view of the installation area.

6. The method of claim 1, wherein causing the one or more cameras to capture a plurality of photographs includes causing an Unmanned Aerial Vehicle (UAV) to fly a flight path over the installation area and capture the plurality of photographs.

7. The method of claim 1, wherein the plurality of photographs are obtained from a combination of an Unmanned Aerial Vehicle (UAV) and one or more camera systems, the UAV configured for exterior aerial capture and the one or more camera systems configured for interior building capture, and wherein exterior and interior photographs are combined to form an integrated 3D model of the installation area.

8. The method of claim 1, wherein determining an optimal route includes, based on the one or more remote visualizations, determining a route which includes a shortest trenching distance for installing the fiber network.

9. The method of claim 1, wherein causing the one or more cameras to capture a plurality of photographs is performed remotely.

10. The method of claim 1, wherein the steps further comprise, after the installing, performing a virtual site inspection of the fiber network.

11. The method of claim 10, wherein performing a virtual site inspection of the fiber network includes causing the one or more cameras to capture a plurality of photographs of the installation area after the installation is completed.

12. The method of claim 10, wherein the steps further comprise providing a close-out package, wherein the close-out package provides verification of the fiber network installation.

* * * * *